(12) United States Patent
Satoh et al.

(10) Patent No.: US 8,520,927 B2
(45) Date of Patent: Aug. 27, 2013

(54) MEDICAL IMAGE PROCESSING APPARATUS AND ULTRASONIC IMAGING APPARATUS

(75) Inventors: Shunsuke Satoh, Nasushiobara (JP); Hitoshi Yamagata, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 809 days.

(21) Appl. No.: 12/651,562

(22) Filed: Jan. 4, 2010

(65) Prior Publication Data
US 2010/0172562 A1 Jul. 8, 2010

(30) Foreign Application Priority Data

Jan. 7, 2009 (JP) ................................. 2009-001927

(51) Int. Cl.
*G06K 9/00* (2006.01)
(52) U.S. Cl.
USPC .......................................... 382/131; 382/128
(58) Field of Classification Search
USPC ................................. 382/128–134
See application file for complete search history.

(56) References Cited

U.S. PATENT DOCUMENTS

2006/0241463 A1* 10/2006 Shau et al. ..................... 600/455
2009/0124907 A1* 5/2009 Bruce et al. .................... 600/458

FOREIGN PATENT DOCUMENTS

JP 2008-170408 7/2008

OTHER PUBLICATIONS

Makiko Hayashi et al., "Correlation Between the Blood Supply and Grade Malignancy of Hepatocellular Nodules Associated with Liver Cirrhosis: Evaluation by CT During Intraarterial Injection of Contrast Medium", AJR:172, Apr. 1999, pp. 969-976.

* cited by examiner

*Primary Examiner* — Hoon Song
(74) *Attorney, Agent, or Firm* — Oblon, Spivak, McClelland, Maier & Neustadt, L.L.P.

(57) ABSTRACT

A tumor region setting section sets a liver tumor region for a plurality of ultrasonic image data along a time series acquired by ultrasonically capturing a subject to which a contrast agent has been administered. A TIC generator obtains a time change indicating a time change of the pixel values in the liver tumor region based on the plurality of ultrasonic image data along the time series. A peak-detection section specifies a peak point of the time change and obtains the time and pixel value of that peak point. A first determination section determines the degree of malignancy of the liver tumor based on the time and pixel value of the peak point. A display controller displays the degree of malignancy on a display section.

16 Claims, 15 Drawing Sheets

MEDICAL IMAGE PROCESSING APPARATUS AND ULTRASONIC IMAGING APPARATUS

BACKGROUND OF THE INVENTION

1. Field of the Invention

The present invention relates to a medical image processing apparatus that makes a determination regarding the presence of a tumor based on ultrasonic images acquired by capturing a subject to which a contrast agent has been administered. The present invention also relates to an ultrasonic imaging apparatus that makes a determination regarding the presence of a tumor based on ultrasonic images.

2. Description of the Related Art

"Malignant neoplasm (cancer)", "heart disease" and "cerebrovascular disease (cerebral stroke)" have been cited as three major causes of death in Japan. Cancer causes the highest number of fatalities among these three major causes, accounting for 30% of all fatalities.

When cancers are classified based on the sites of occurrence, they can be classified into lung cancer, stomach cancer, colon cancer, and liver cancer in descending order of the number of patients affected in Japan. However, the 5-year relative survival of patients with stomach cancer or colon cancer is around 60%, which is relatively high.

In contrast, the 5-year relative survival of patients with lung cancer or liver cancer is around 18%, which is relatively low. In this way, it is known that therapeutic prognoses of lung cancer and liver cancer are poor.

Liver tumor, which is a tumor occurring in the liver, is classified roughly into three types: primary hepatocarcinoma, metastatic hepatocarcinoma, and hemangioma. Primary hepatocarcinoma is a malignant tumor originating in the hepatic cells.

Metastatic hepatocarcinoma is a secondary malignant tumor occurring due to metastasis to a liver of cancer cells that developed in other organs. Primary hepatocarcinoma and metastatic hepatocarcinoma are believed to be liver tumors leading to liver cancer. On the other hand, hemangioma (hepatic hemangioma) is a benign tumor formed by numerous large and small blood vessels intertwining with each other.

However, because primary hepatocarcinoma and metastatic hepatocarcinoma occasionally that have forms similar to that of hepatic hemangioma sometimes occur, observation of the clinical course is required.

Moreover, the degree of malignancy of primary hepatocarcinoma differs depending on the degree of differentiation of neoplastic hepatic cells (degree of maturation of hepatic cells).

Specifically, the degree of malignancy is higher when there are fewer instances of division of hepatic cells during the period of tumorigenic transformation (i.e., when the degree of progression of differentiation from hepatic stem cells to hepatic cells is immature).

Therefore, if a liver tumor is found, it is important to distinguish whether the liver tumor found is any of a primary hepatocarcinoma, metastatic hepatocarcinoma, or hemangioma.

Moreover, if the liver tumor found is a primary hepatocarcinoma, it is necessary to promptly identify its degree of malignancy (degree of differentiation) in its level and formulate a treatment plan according to the characteristics of the liver tumor in order to improve the therapeutic prognosis of the liver cancer.

Therefore, studies are being conducted in which liver tumors are identified in ultrasound diagnoses using a contrast agent.

Specifically, it is to identify liver tumors with a contrast echo method that acquires ultrasonic images using microbubbles that can be intravenously administered as an ultrasonic contrast agent.

According to the contrast echo method, blood-flow signals are enhanced by microbubbles introduced into the blood vessels. This allows a physician to clearly observe the blood-flow dynamics by referring to ultrasonic images using the contrast agent. Furthermore, the microbubbles are characterized by being taken up by Kupffer cells in the liver via the blood vessels to specifically undergo phagocytosis.

In a liver tumor, because Kupffer cells have decreased to a greater extent than in the normal tissues, the degree of uptake of microbubbles is reduced. Consequently, in a liver tumor, echo reflections will have low signals due to the microbubbles. This makes it possible for the physician to clearly observe the form of the liver tumor by referring to ultrasonic images using the contrast agent.

Structures in the liver stained with the ultrasonic contrast agent are classified roughly into the blood vessels, the portal vein, and the hepatic parenchyma. The process from injecting the ultrasonic contrast agent into the subject to staining of the blood vessels, the portal vein, and the hepatic parenchyma is briefly described in sequence below.

First, because the contrast agent injected into the subject flows into the liver through the blood vessels, the blood vessels are stained (early vascular phase, or arterial phase: a time zone before approximately 40 seconds elapse after the contrast agent is injected).

Then, because the contrast agent flows into the portal vein, the portal vein is stained (late vascular phase, or portal vein phase: a time zone centered on approximately 90 seconds after the contrast agent is injected). Subsequently, the contrast agent is taken up by the hepatic cells and the hepatic parenchyma is stained. Moreover, because the contrast agent in the blood vessels or portal vein is swept away by the blood flow, the blood vessels and the portal vein are no longer stained (parenchymal phase: a time zone centered on approximately 5 minutes after the contrast agent is injected).

Recently, detailed analyses have been performed on staining patterns along the time series from the early vascular phase leading to the parenchymal phase via the late vascular phase in a liver tumor. As a result, it has been revealed that each liver tumor type (primary hepatocarcinoma, metastatic hepatocarcinoma, and hemangioma) has specific tendencies in its staining patterns along the time series (e.g., "Differential diagnosis of neoplastic lesion of the liver using Levovist." Rad Fan Vol. 2 No. 2: 62-65, 2004). Furthermore, it has been revealed that primary hepatocarcinoma has specific tendencies in its staining patterns along the time series depending on the degree of differentiation (e.g. "Findings from contrast of hepatocellular carcinoma (HCC): Attempt to diagnose the degree of differentiation using Levovist." Rad Fan Vol. 2 No. 2: 66-68, 2004).

The staining patterns by type of liver tumor will be described with reference to FIG. 1. FIG. 1 is a diagram for describing the staining patterns by type of liver tumor. In addition, FIG. 1 is a diagram showing ultrasonic images acquired along the time series and schematically shows the staining patterns in the periphery centered on the liver tumor.

As shown in FIG. 1, the staining patterns of primary hepatocarcinoma show that from the early vascular phase to the late vascular phase, the entire liver region is gradually stained. Moreover, the staining patterns of primary hepatocarcinoma show that in the parenchymal phase, portions of the liver tumor other than the internal region and the hepatic parenchyma around the liver tumor are stained.

Moreover, the staining patterns of metastatic hepatocarcinoma show that from the early vascular phase to the late vascular phase, the region from the outside leading to the inside centered on the boundary of the liver tumor is gradually stained. Moreover, the staining patterns of metastatic hepatocarcinoma show that in the parenchymal phase, the entire liver tumor is not stained and the hepatic parenchyma around the liver tumor is stained.

Moreover, the staining patterns of hemangioma show that from the early vascular phase to the late vascular phase, the regions other than the internal region of the liver tumor are gradually stained.

Moreover, the staining patterns of hemangioma show that in the parenchymal phase, portions of the liver tumor other than the internal region and the hepatic parenchyma around the liver tumor are stained.

Next, with reference to FIG. 2, the staining patterns for each degree of differentiation of primary hepatocarcinoma will be described.

FIG. 2 is a diagram showing the staining patterns for each degree of differentiation of primary hepatocarcinoma. In addition, FIG. 2 is a diagram schematically showing the staining patterns within the liver tumor region where the liver tumor is a primary hepatocarcinoma.

In the liver tumor identified as a primary hepatocarcinoma, if the degree of differentiation of neoplastic hepatic cells is high and there are dysplastic nodules that are either malignant or benign, the staining pattern tends to be "no staining in the early vascular phase, weak staining in the late vascular phase, and weak staining in the parenchymal phase" as in the pattern A shown in FIG. 2.

Moreover, in the liver tumor identified as a primary hepatocarcinoma, if well-differentiated hepatic cells have become a malignant tumor, the staining pattern tends to be "weak staining" throughout the early vascular phase, late vascular phase, and parenchymal phase as in the pattern B.

Moreover, as the degree of differentiation of neoplastic hepatic cells becomes lower (as the degree of malignancy becomes higher) from the status shown in the pattern B, the staining pattern becomes those patterns shown in the pattern C, pattern D, and pattern E. Namely, the pattern C tends to be "weak staining in the early vascular phase, staining equivalent to that of the surrounding hepatic parenchyma in the late vascular phase, and staining equivalent to that of the surrounding hepatic parenchyma in the parenchymal phase". The pattern D, which has a lower degree of differentiation than the pattern C, tends to be "weak staining in the early vascular phase, no staining in the late vascular phase, and no staining in the parenchymal phase".

The moderately differentiated pattern E, which has a lower degree of differentiation than the pattern D, tends to be "intensive staining in the early vascular phase, weak staining in the late vascular phase, and no staining in the parenchymal phase".

Namely, by interpreting images while comparing the staining patterns of liver tumors revealed by the recent study results as shown in FIGS. 1 and 2 with ultrasonic images representing the liver stained with the ultrasonic contrast agent, the physician can identify each liver tumor.

On the other hand, in the above-mentioned technology, there was a problem in that objective results for identifying the liver tumor could not be obtained quickly.

Namely, in the above-mentioned technology, the physician visually checks ultrasonic images in each time phase displayed in parallel to determine the staining pattern in each time phase. Then, after comprehending the combination of changes of the pattern represented in the staining patterns, the physician identifies the type of liver tumor. In this way, subjective elements are included in identification, thereby reducing the objectivity of the results of identification. Moreover, there was a problem in that the identification itself took time.

Moreover, as shown in FIG. 2, if the liver tumor is a primary hepatocarcinoma, the referred staining pattern shows various tendencies. Therefore, there is also an absence of objectivity in the results of identification in cases of visually identifying the degree of malignancy of a primary hepatocarcinoma. Moreover, there was a problem in that the identification itself took time.

Therefore, the applicant filed a patent application of an image processing apparatus, an ultrasonic imaging apparatus, and an image processing program that can quickly obtain objective results for identifying a liver tumor (patent application No. 2008-170408). The invention according to this patent application acquires a plurality of ultrasonic images by ultrasonically capturing a subject along a time series to which a contrast agent has been administered. Then, staining patterns of the contrast agent along the time series are classified by the type of liver tumor. Then, based on the staining patterns by type, the type of liver tumor set in the plurality of ultrasonic images is determined. In this way, the staining patterns of the contrast agent are quantitatively analyzed to determine the type of liver tumor.

On the other hand, it has been reported that liver tumors can be distinguished by analyzing the hemodynamics within the liver tumor region ("Correlation Between the Blood Supply and Grade of Malignancy of Hepatocellular Nodules Associated with Liver Cirrhosis: Evaluation by CT During Intraarterial Injection of Contrast Medium." AJR: 172, April 1999 P. 969-976).

Namely, this is a method of judging the degree of malignancy based on the blood flow volume within the liver tumor and the information of which is dominant, either the arterial blood flow volume or the blood flow volume in the portal vein. With reference to FIG. 3, the correlation between the degree of malignancy (degree of differentiation) of a liver tumor and the blood flow volume will be described. FIG. 3 is a diagram showing the correlation between the degree of malignancy of a liver tumor and the blood flow volume.

FIG. 3 shows the correlation between the arterial blood flow volume that nourishes healthy hepatic cells, the arterial blood flow volume that nourishes the tumor, and the blood flow volume in the portal vein, with the degree of malignancy of the liver tumor. For example, if the blood flow volume in the portal vein is higher than the arterial blood flow volume (i.e., the blood flow volume in the portal vein is more dominant than the arterial blood flow volume), the degree of malignancy of the liver tumor is classified as class 1, which indicates a low degree of malignancy. On the other hand, as the arterial blood flow volume that nourishes the tumor increases and the arterial blood flow volume and the blood flow volume in the portal vein that nourishes healthy hepatic cells decreases, the degree of malignancy gradually becomes higher. When the blood flow volume is only the arterial blood flow volume that nourishes the tumor, the degree of malignancy of the liver tumor is classified as class 6, which indicates the highest degree of malignancy.

As described above, based on the dominance relationship between the arterial blood flow volume and the blood flow volume in the portal vein, it is possible to judge the degree of malignancy of liver tumor. However, in the above-mentioned patent application (patent application No. 2008-170408), there are no descriptions of any method of determining the degree of malignancy of liver tumor based on the dominance relationship between the arterial blood flow volume and the blood flow volume in the portal vein.

Moreover, in the above-mentioned patent application (patent application No. 2008-170408), there are no descriptions of any method of obtaining the boundary time between the early vascular phase (arterial phase) and the late vascular phase (portal vein phase). Herein, the arterial phase is a time phase in which only the arteries are intensively stained after the contrast agent is injected. Moreover, the portal vein phase is a time phase in which the portal vein is stained after the arterial phase. However, in the portal vein phase, the contrast agent has not completely escaped from the arteries. Therefore, in the portal vein phase, both the arteries and the portal vein are stained.

There is no established method of quantitatively obtaining the boundary time phase between the arterial phase and the portal vein phase. Therefore, the physician visually checks ultrasonic images to subjectively judge the boundary time phase. In this way, the boundary time phase between the arterial phase and the portal vein phase is not objectively obtained, and it is therefore likely that the accuracy of generating staining patterns in the arterial phase or the accuracy of determining the type of liver tumor are affected.

SUMMARY OF THE INVENTION

The present invention is intended to provide a medical image processing apparatus and an ultrasonic imaging apparatus that can determine the degree of malignancy of a liver tumor based on the arterial blood flow volume and the blood flow volume in the portal vein.

The present invention is also intended to provide a medical image processing apparatus and an ultrasonic imaging apparatus that can quantitatively specify the boundary time between the arterial phase and the portal vein phase.

The first aspect of the present invention is a medical image processing apparatus comprising: a tumor region setting part configured to receive a plurality of ultrasonic image data along a time series acquired by ultrasonically capturing a subject to which a contrast agent has been administered and to set a liver tumor region for said plurality of ultrasonic image data along the time series; a first time-change calculator configured to obtain a first time change indicating a time change of the pixel values in said set liver tumor region based on said plurality of ultrasonic image data along the time series; a first peak-detection part configured to specify a first peak point of said first time change and to obtain the time and pixel value of said first peak point; a first determination part configured to determine the degree of malignancy of said liver tumor based on the time and pixel value of said first peak point; and a display controller configured to cause a display to display said degree of malignancy determined by said first determination part.

According to this first aspect, based on the plurality of ultrasonic image data along the time series, the peak point of the time change of the pixel values in the liver tumor region is obtained. Then, based on the time and brightness value of that peak point, it is possible to objectively determine the degree of malignancy of the liver tumor.

Namely, by obtaining the time and brightness value of the peak, it is possible to specify the correlation between the blood flow volume to the artery and the blood flow volume to the portal vein. As a result, it is possible to objectively determine the degree of malignancy of the liver tumor based on that correlation.

Moreover, by comparing time changes of the pixel values in the liver tumor region with time changes of the pixel values in a region of interest set in the portal vein, it is possible to quantitatively specify the boundary time between the arterial phase and the portal vein phase.

The second aspect of the present invention is an ultrasonic imaging apparatus comprising: an ultrasonic imaging part configured to acquire a plurality of ultrasonic image data along a time series by ultrasonically capturing a subject to which a contrast agent has been administered; a liver tumor region setting part configured to set a liver tumor region for said plurality of ultrasonic image data along the time series; a first time-change calculator configured to obtain a first time change indicating a time change of the pixel values in said set liver tumor region based on said plurality of ultrasonic image data along the time series; a first peak-detection part configured to specify a first peak point of said first time change and to obtain the time and pixel value of said first peak point; a first determination part configured to determine the degree of malignancy of said liver tumor based on the time and pixel value of said first peak point; and a display controller configured to cause a display part to display said degree of malignancy determined by said first determination part.

DETAILED DESCRIPTION OF THE EMBODIMENTS

Figure 4:
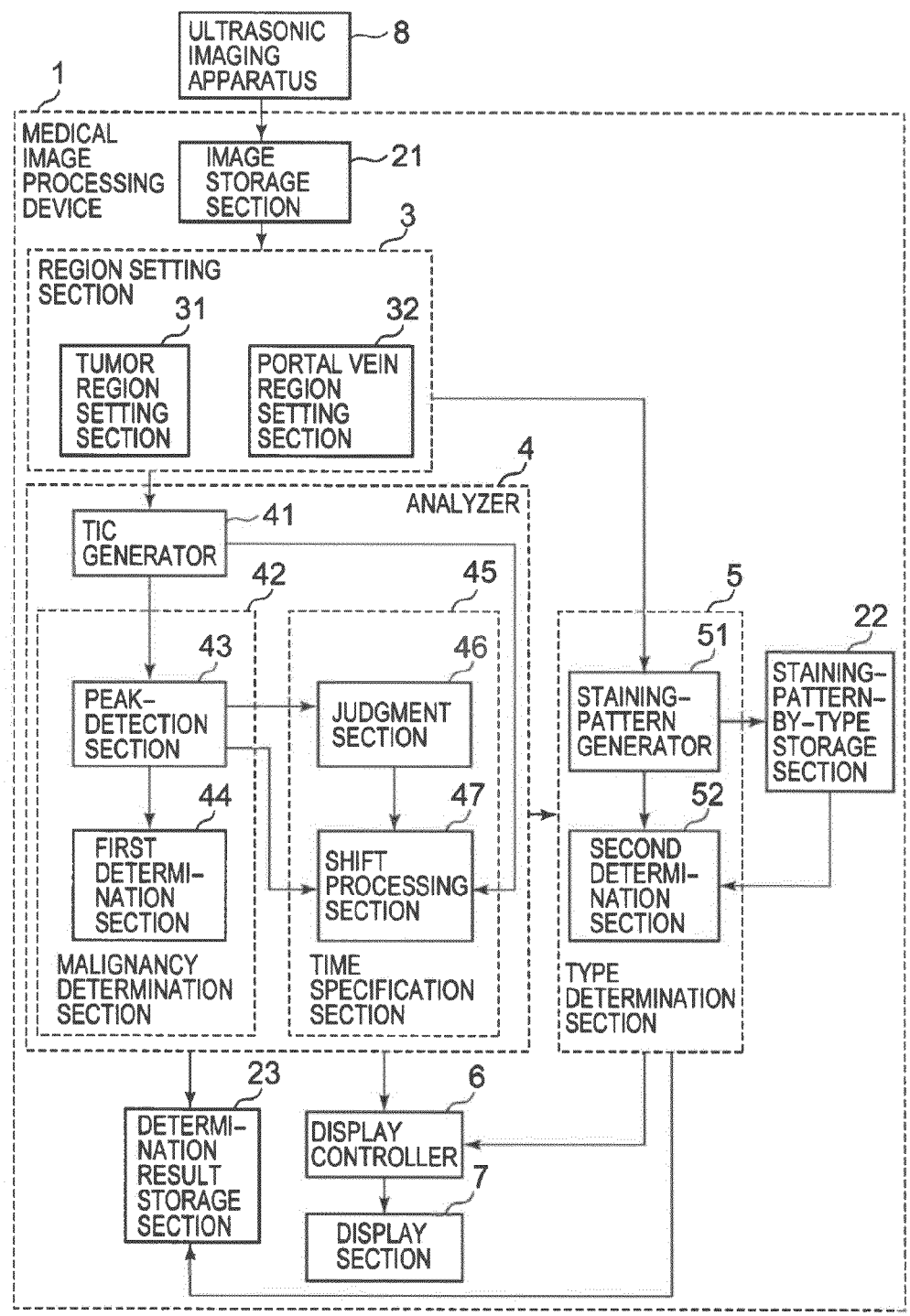
FIG. 4 is a block diagram showing a medical image processing apparatus according to an embodiment of the present invention.

The medical image processing apparatus and the ultrasonic imaging apparatus according to an embodiment of the present invention will be described. With reference to FIG. 4, a medical image processing apparatus according to an embodiment of the present invention will be described. FIG. 4 is a block diagram showing a medical image processing apparatus according to an embodiment of the present invention.

A medical image processing apparatus 1 according to this embodiment comprises a region setting section 3, an analyzer 4, a type determination section 5, a display controller 6, a display section 7, a image storage section 21, staining-pattern-by-type storage section 22, and a determination result storage section 23. Moreover, the medical image processing apparatus 1 is connected to an ultrasonic imaging apparatus 8.
(Ultrasonic Imaging Apparatus 8)

The ultrasonic imaging apparatus 8 comprises an ultrasonic probe. The ultrasonic imaging apparatus 8 sends ultrasonic waves to a subject and receives reflected waves from the subject to generate ultrasonic image data based on the reflected waves. The ultrasonic image data acquired by the ultrasonic imaging apparatus 8 is output to the medical image processing apparatus 1 and stored in the image storage section 21. For example, the ultrasonic imaging apparatus 8 acquires a plurality of volume data captured at different times (a plurality of volume data along a time series) by ultrasonically capturing a three-dimensional region within the subject. Moreover, the ultrasonic imaging apparatus 8 may acquire a plurality of tomographic data captured at different times (a plurality of tomographic data along a time series) by ultrasonically capturing a cross-section within the subject. In this way, the ultrasonic imaging apparatus 8 acquires the plurality of ultrasonic image data along the time series.

The ultrasonic imaging apparatus 8 may perform a contrast echo method for acquiring ultrasonic image data using microbubbles that may be intravenously administered as an ultrasonic contrast agent. The ultrasonic contrast agent injected into the subject with drip infusion or injection into the blood vessel travels through the bloodstream in the body and reaches the intended organ. In this embodiment, the ultrasonic imaging apparatus 8 acquires the plurality of ultrasonic image data along the time series by capturing the subject's liver as a target to which the ultrasonic contrast agent has been administered.

The ultrasonic contrast agent administered to the subject flows into the liver. Meanwhile, the ultrasonic imaging apparatus 8 is in the process of capturing, and the plurality of ultrasonic image data representing the flow of the ultrasonic contrast agent into the liver may thereby be acquired. The ultrasonic imaging apparatus 8 corresponds to an example of the "ultrasonic imaging part" of the present invention.

In addition, the following describes a case in which the ultrasonic probe is fixed with the position of the ultrasonic probe unchanged and the position of the liver represented in an ultrasonic image unchanged while capturing is performed by the ultrasonic imaging apparatus 8.

Specifically, a case is described in which the ultrasonic probe is fixed with the position of the liver represented in an ultrasonic image unchanged after the ultrasonic contrast agent is injected into the subject until entering the early vascular phase (arterial phase) in which the blood vessels are stained, the late vascular phase (portal vein phase) in which the portal vein is stained, and the parenchymal phase in which the hepatic parenchyma is stained and the blood vessels and the portal vein are no longer stained.

However, even if the position of the ultrasonic probe is displaced and the position of the liver represented in the ultrasonic image is changed, it is possible to apply the present invention.
(Image Storage Section 21)

The image storage section 21 stores a plurality of ultrasonic image data captured at different times (a plurality of ultrasonic image data along a time series) acquired by capturing with the ultrasonic imaging apparatus 8. Specifically, the image storage section 21 stores the plurality of ultrasonic image data along the time series captured by the ultrasonic imaging apparatus 8 with the subject's liver as the target to which the ultrasonic contrast agent has been administered.
(Region Setting Section 3)

The region setting section 3 comprises a tumor region setting section 31 and a portal vein region setting section 32. The region setting section 3 reads the plurality of ultrasonic image data along the time series from the image storage section 21 and sets the liver tumor region and the portal vein region for a plurality of ultrasonic images.

For example, using an operating section (not shown), an operator designates the plurality of ultrasonic image data along the time series to be identified. The region setting section 3, according to the designation made by the operator, reads the plurality of ultrasonic image data along the time series to be identified from the image storage section 21 and sets the liver tumor region and the portal vein region for each ultrasonic image. The following describes the processing details of the tumor region setting section 31 and processing details of the portal vein region setting section 32.
(Tumor Region Setting Section 31)

The tumor region setting section 31 sets the liver tumor region for the plurality of ultrasonic images along the time series. Specifically, the tumor region setting section 31 specifies the position of the liver tumor represented in each of the plurality of ultrasonic image along the time series and sets the liver tumor region for each ultrasonic image.

Figure 5A:
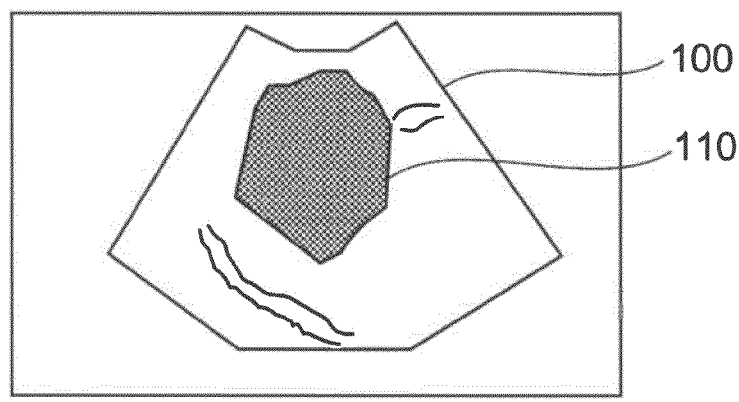
FIGS. 5A and 5B are diagrams showing liver tumor regions represented in ultrasonic images.
Figure 5B:
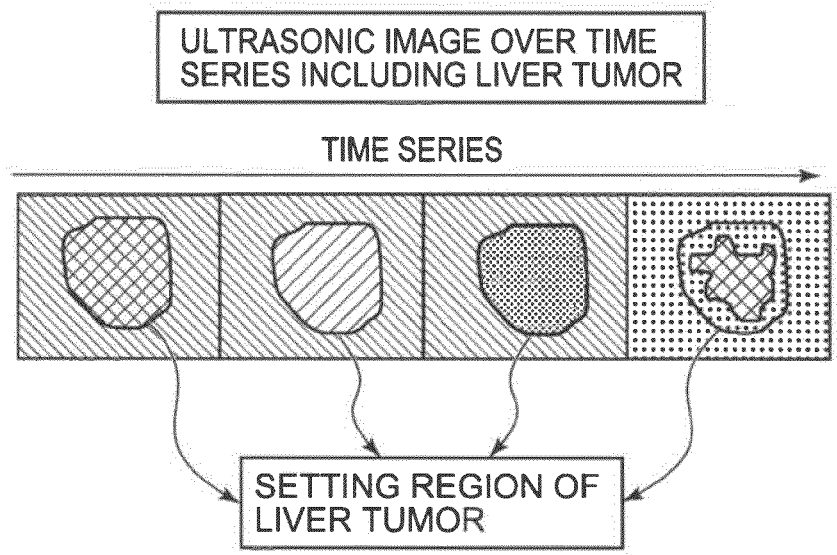

With reference to FIGS. 5A and 5B, liver tumor regions represented in ultrasonic images will be described. FIGS. 5A and 5B are diagrams showing liver tumor regions represented in ultrasonic images.

As shown in FIG. 5A, the tumor region setting section 31 specifies a liver tumor region 110 represented in an ultrasonic image 100. For example, the liver tumor region represented in an ultrasonic image acquired in the parenchymal phase has a lower brightness than the surrounding tissue. Therefore, the tumor region setting section 31 specifies the position of the liver tumor region with a lower brightness than the surrounding tissue in the ultrasonic image through image analysis. Furthermore, as shown in FIG. 5B, the tumor region setting section 31 sets the liver tumor region for all of the ultrasonic images by applying the coordinates of the specified liver tumor region to the remaining ultrasonic images. In this way, the tumor region setting section 31 sets the liver tumor region for all of the ultrasonic images to be identified. The tumor region setting section 31 corresponds to an example of the "tumor region setting part" of the present invention.

The tumor region setting section 31 may extract the liver tumor region from each ultrasonic image and set the liver tumor region for each ultrasonic image through image analysis of each ultrasonic image.

The operator may set the liver tumor region for each ultrasonic image by designating the position of the liver tumor region represented in each ultrasonic image using the operating section (not shown). In this case, the display controller 6 displays each ultrasonic image to be identified on the display section 7. The operator designates the position of the liver tumor region represented in each ultrasonic image using the operating section. When the position of the liver tumor region represented in each ultrasonic image is designated by the operator, the tumor region setting section 31 sets the liver tumor region for each ultrasonic image based on coordinate information indicating the designated position.

(Portal Vein Region Setting Section 32)

The portal vein region setting section 32 sets a region of interest (ROI) in the position of the portal vein region represented in each of the plurality of ultrasonic images along the time series. In this embodiment, the portal vein region setting section 32 sets the region of interest (ROI) in a position of the portal vein region not included in the liver tumor region. Hereinafter, the region of interest (ROI) set in the portal vein region is referred to as the "portal vein ROI". The setting of this portal vein ROI is performed by the operator.

Figure 6:
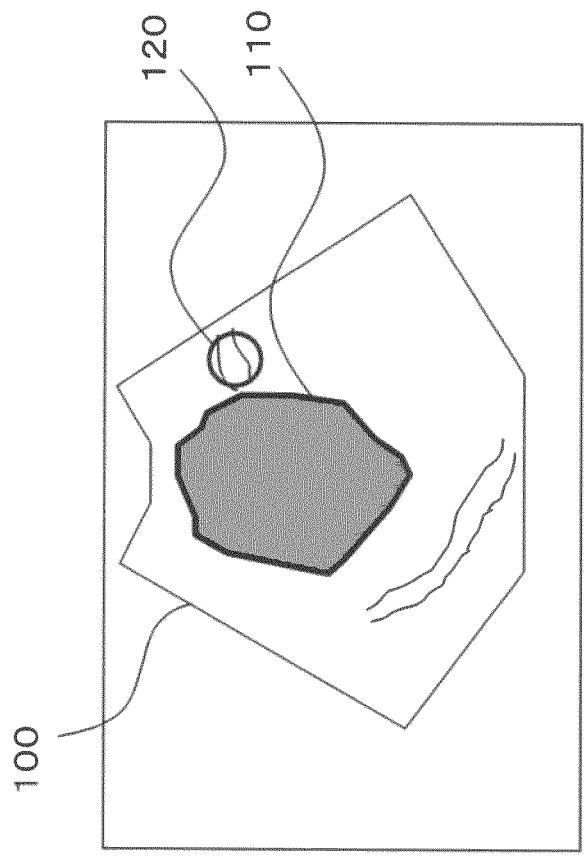
FIG. 6 is a diagram showing an example of setting a region of interest (ROI) for the portal vein region.

With reference to FIG. 6, an example of setting a portal vein ROI will be described. FIG. 6 is a diagram showing an example of setting a region of interest (ROI) for the portal vein region. The display controller 6 displays an ultrasonic image 100 to be identified on the display section 7. Furthermore, the display controller 6 displays on the display section 7 a portal vein ROI 120 for setting the portal vein region superimposed on the ultrasonic image 100. From this state, the operator moves the portal vein ROI 120 on the ultrasonic image 100 using the operating section and designates the portal vein region by surrounding the portal vein region not included in the liver tumor region with the portal vein ROI 120. When the portal vein region on each ultrasonic image is designated by the operator, the portal vein region setting section 32 sets the portal vein region for each ultrasonic image based on coordinate information indicating the designated position. The portal vein region setting section 32 corresponds to an example of the "region of interest setting part" of the present invention.

The operator may designate one point of the portal vein represented in the ultrasonic image using the operating section, and the portal vein region setting section 32 may receive coordinate information of the designated point and set a predefined range of the region including the designated point as the portal vein region.

As described above, when the liver tumor region and the portal vein ROI for the portal vein region are set, the region setting section 3 outputs the plurality of ultrasonic image data along the time series to be identified to a TIC generator 41 in the analyzer 4. Moreover, the region setting section 3 outputs positional information (coordinate information) indicating the position of the liver tumor region set for each ultrasonic image to the TIC generator 41. Moreover, the region setting section 3 outputs positional information (coordinate information) indicating the position of the portal vein ROI (the position of the portal vein region) set for each ultrasonic image to the TIC generator 41.

Moreover, the region setting section 3 outputs the plurality of ultrasonic image data along the time series to be identified and positional information indicating the position of the liver tumor region set for each ultrasonic image to a staining-pattern generator 51 in the type determination section 5.

(Analyzer 4)

The analyzer 4 comprises a TIC generator 41, a malignancy determination section 42, and a time specification section 45. The analyzer 4 obtains time changes of dense staining of the ultrasonic contrast agent by targeting the liver tumor region and the portal vein region set by the region setting section 31. Then, the analyzer 4 determines the degree of malignancy of the liver tumor based on the time changes of the dense staining of the ultrasonic contrast agent.

Moreover, the analyzer 4 specifies the boundary time between the early vascular phase (arterial phase) and the late vascular phase (portal vein phase) based on the time changes of the dense staining of the ultrasonic contrast agent.

(TIC Generator 41)

Based on the plurality of ultrasonic image data along the time series to be identified, the TIC generator 41 obtains a curve (Time Intensity Curve, hereinafter referred to as "TIC") representing the time changes of dense staining of the ultrasonic contrast agent in the liver tumor region and the TIC in the portal vein ROI set in the portal vein region.

For example, the TIC generator 41 obtains the mean (hereinafter referred to as "mean brightness") of the brightness value (pixel value) of each pixel in the liver tumor region set in the ultrasonic image. The TIC generator 41 obtains the mean brightness in the liver tumor region for all of the ultrasonic images along the time series to be identified.

Then, the TIC generator 41 generates a TIC in the liver tumor region by obtaining time changes of the mean brightness of the liver tumor region in each ultrasonic image. Specifically, the TIC generator 41 generates a TIC by plotting the mean brightness of the liver tumor region in each ultrasonic image on the time axis along the time series.

By way of example, among the plurality of ultrasonic images to be identified, the TIC generator 41 defines the acquisition time of the ultrasonic image that has been acquired earliest as the reference time.

Then, the TIC generator 41, with reference to that reference time, generates a TIC by plotting the mean brightness of the liver tumor region in each ultrasonic image on the time axis along the time series. Hereinafter, the TIC in the liver tumor region is referred to as the "liver tumor TIC".

Similarly, the TIC generator 41 obtains the mean brightness in the portal vein ROI set in the ultrasonic image, and obtains the mean brightness in the portal vein ROI for all of the ultrasonic images along the time series to be identified. Then, the TIC generator 41 obtains a TIC in the portal vein ROI by obtaining the time changes of the mean brightness of the portal vein ROI in each ultrasonic image. Hereinafter, the TIC in the portal vein ROI is referred to as the "portal vein TIC".

Figure 7:
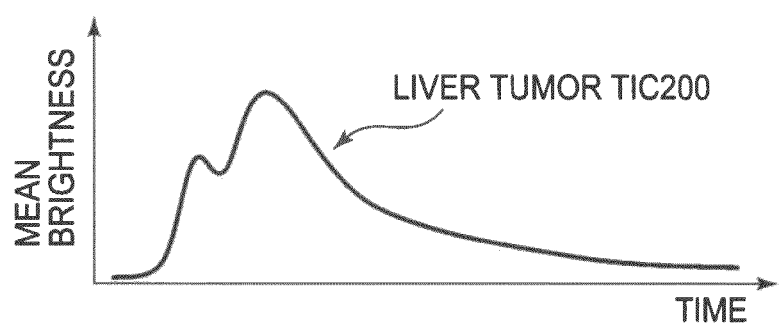
FIG. 7 is a diagram showing a TIC (Time Intensity Curve) in the liver tumor region.

FIG. 7 shows an example of a TIC in the liver tumor region. FIG. 7 is a diagram showing a TIC in the liver tumor region. In FIG. 7, the horizontal axis represents time and the vertical axis represents the mean brightness. In FIG. 7, a liver tumor TIC 200 in the liver tumor region 110 is shown. When the ultrasonic contrast agent flows into a tissue, the brightness value of that tissue increases in magnitude.

Therefore, the magnitude of the brightness value represents the status of dense staining of the ultrasonic contrast agent. Therefore, a TIC representing time changes of the brightness value in each site will represent time changes of the dense staining of the ultrasonic contrast agent (dense staining process of the ultrasonic contrast agent) in each site.

The TIC generator 41 outputs liver tumor TIC data and portal vein TIC data to a peak-detection section 43 in the malignancy determination section 42 and a shift processing section 47 in the time specification section 45.

The TIC generator 41 corresponds to an example of the "first time-change calculator" and the "second time-change calculator" of the present invention. Moreover, the liver tumor TIC corresponds to an example of the "first time change" of the present invention. Moreover, the portal vein TIC corresponds to an example of the "second time change" of the present invention.

In this embodiment, the malignancy determination section 42 determines the degree of malignancy of the liver tumor based on the liver tumor TIC. Moreover, the time specification section 45 specifies the boundary time between the early vascular phase (arterial phase) and the late vascular phase (portal vein phase) based on the liver tumor TIC and the portal vein TIC.

(Malignancy Determination Section 42)

The process of determining the degree of malignancy performed by the malignancy determination section 42 will be described. The malignancy determination section 42 comprises a peak-detection section 43 and a first determination section 44.

(Peak-Detection Section 43).

Figure 8:
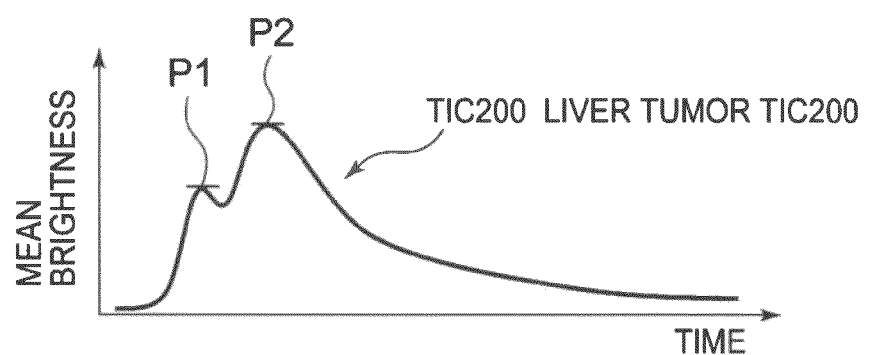
FIG. 8 is a diagram showing a TIC in the liver tumor region.

The peak-detection section 43 detects a peak point of the liver tumor TIC by analyzing the gradient of the liver tumor TIC. With reference to FIG. 8, an example of a peak-detection process performed by the peak-detection section 43 is described. FIG. 8 is a diagram showing a TIC in the liver tumor region. In FIG. 8, the horizontal axis represents time and the vertical axis represents the mean brightness.

The peak-detection section 43 obtains the time and brightness value (mean brightness) of the peak point of the liver tumor TIC 200 by obtaining the gradient of the liver tumor TIC 200. For example, the peak-detection section 43 obtains the peak point of the liver tumor TIC 200 by differentiating the liver tumor TIC 200. In the example shown in FIG. 8, the peak-detection section 43 detects a peak point P1 and a peak point P2, and obtains the time and brightness value (mean brightness) of the peak point P1 and the time and brightness value (mean brightness) of the peak point P2. The peak point obtained from the liver tumor TIC corresponds to an example of the "first peak point" of the present invention.

Moreover, the peak-detection section 43 detects a peak point of the portal vein TIC by analyzing the gradient of the portal vein TIC.

Namely, the peak-detection section 43 obtains the time and brightness value (mean brightness) of the peak point of the portal vein TIC by obtaining the gradient of the portal vein TIC. The peak point obtained from the portal vein TIC corresponds to an example of the "second peak point" of the present invention.

The peak-detection section 43 outputs information indicating the time and brightness value (mean brightness) of the peak point of the liver tumor TIC to the first determination section 44. In the example shown in FIG. 8, the peak-detection section 43 outputs the respective time information and brightness values of the peak point P1 and the peak point P2 to the first determination section 44. Moreover, the peak-detection section 43 outputs the number of peaks of the liver tumor TIC to a judgment section 46 in the time specification section 45.

In the example shown in FIG. 8, because the peak point P1 and the peak point P2 have been detected, the peak-detection section 43 outputs to the judgment section 46 information indicating that the number of peaks is 2. Moreover, the peak-detection section 43 outputs to the shift processing section 47 in the time specification section 45 time information of the peak point of the liver tumor TIC and time information of the peak point of the portal vein TIC. The peak-detection section 43 corresponds to an example of the "first peak-detection section" and the "second peak-detection part" of the present invention.

(First Determination Section 44)

Figure 9:
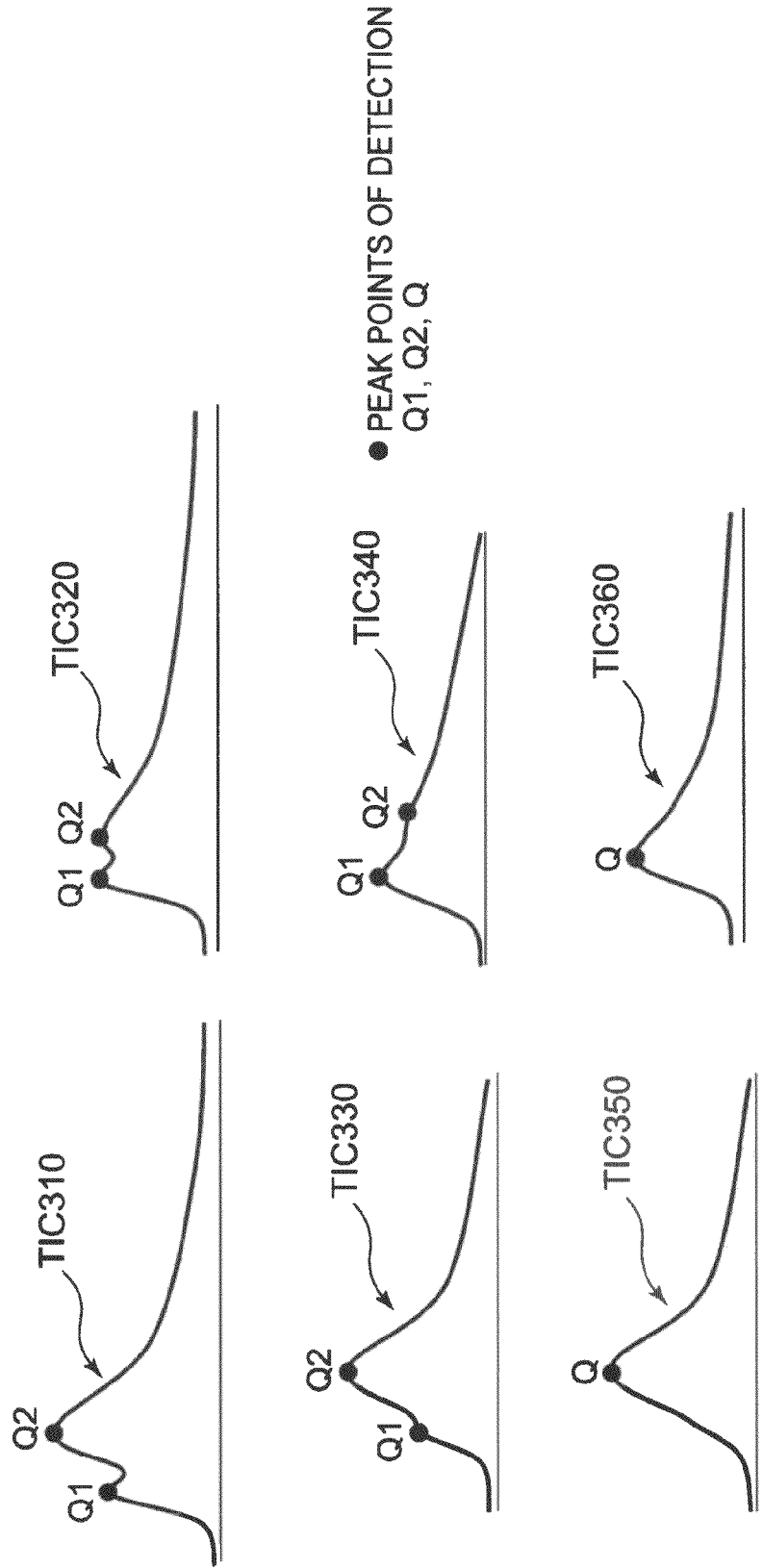
FIG. 9 is a diagram showing a TIC in various conditions.
Figure 10:
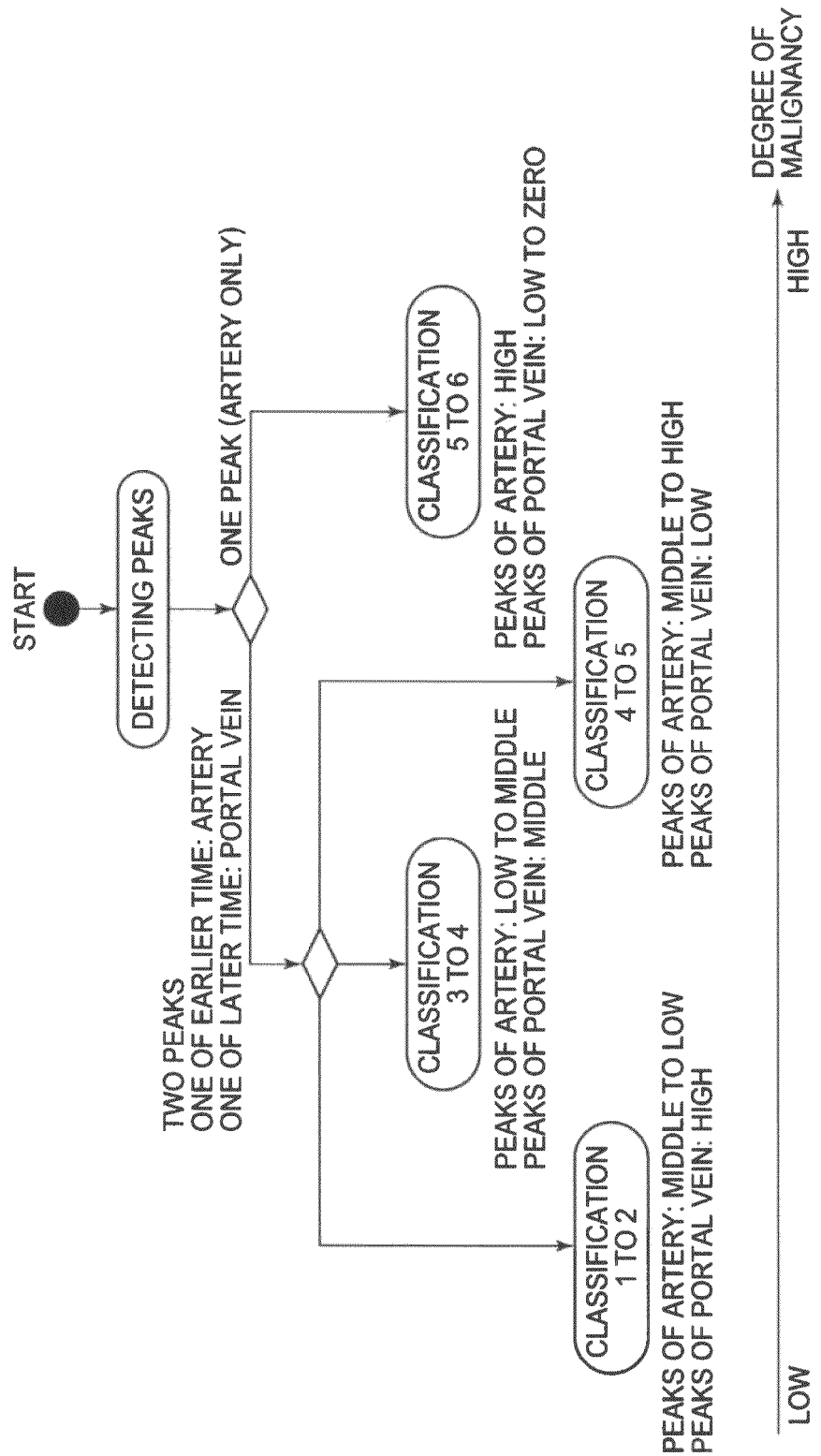
FIG. 10 is a flow chart for describing a process of determining the presence of a liver tumor.

The first determination section 44 determines the degree of malignancy of the liver tumor based on the time information and the brightness value of the peak point of the liver tumor TIC 200. With reference to FIGS. 9 and 10, determination processing for the degree of malignancy is described. FIG. 9 is a diagram showing a TIC in various conditions. FIG. 10 is a flow chart for describing the process of determining the presence of a liver tumor.

The TIC in the liver tumor region may take various forms depending on the degree of malignancy of the liver tumor. For example, like the TIC 310-360 shown in FIG. 9, the TIC may take various forms depending on the degree of malignancy of the liver tumor. Peak points detected in the TIC of the liver tumor region include a peak point resulting from the stained artery and a peak point resulting from the stained portal vein. That is, two peak points are detected. Among the two peak points, the peak point at the earlier time is the peak point resulting from the stained artery. The peak point at the later time is the peak point resulting from the stained portal vein. Each of the TIC 310-340 shown in FIG. 9 has two peak points (Q1, Q2). The peak point Q1 at the earlier time is the peak point resulting from the stained artery.

The peak point Q2 at the later time is the peak point resulting from the stained portal vein.

On the other hand, as in the TIC 350 and the TIC 360, only one peak point Q may be present when staining for either the artery or the portal vein is weak. In this case, there is only one peak point.

Therefore, it is preferred that the peak-detection section 43 treats the TIC with a smoothing process or establishes proper criteria for the detection accuracy of peak points so that the number of peaks will be 1 or 2.

Figure 1:
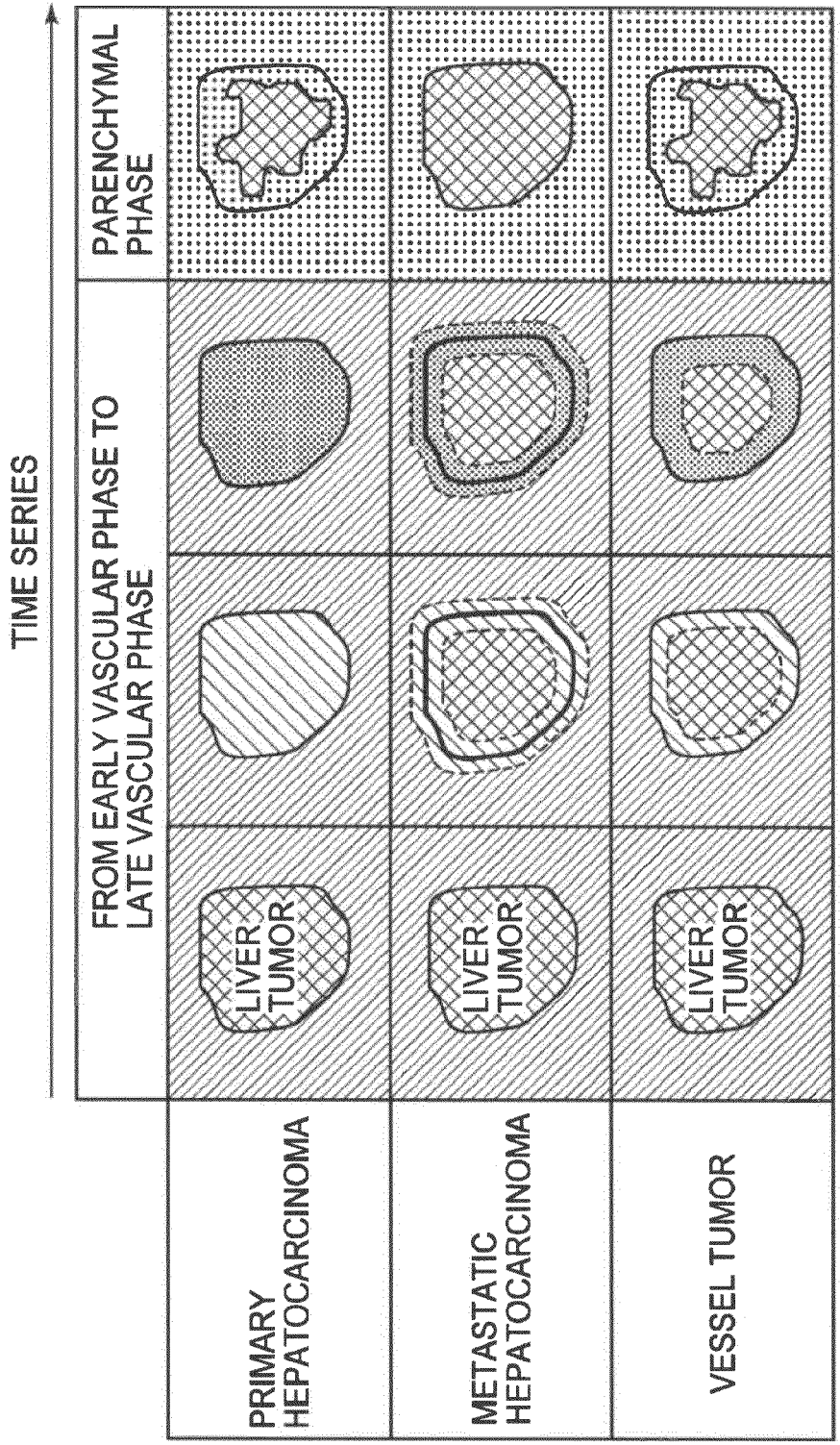
FIG. 1 is a diagram for describing the staining patterns by type of liver tumor.
Figure 2:
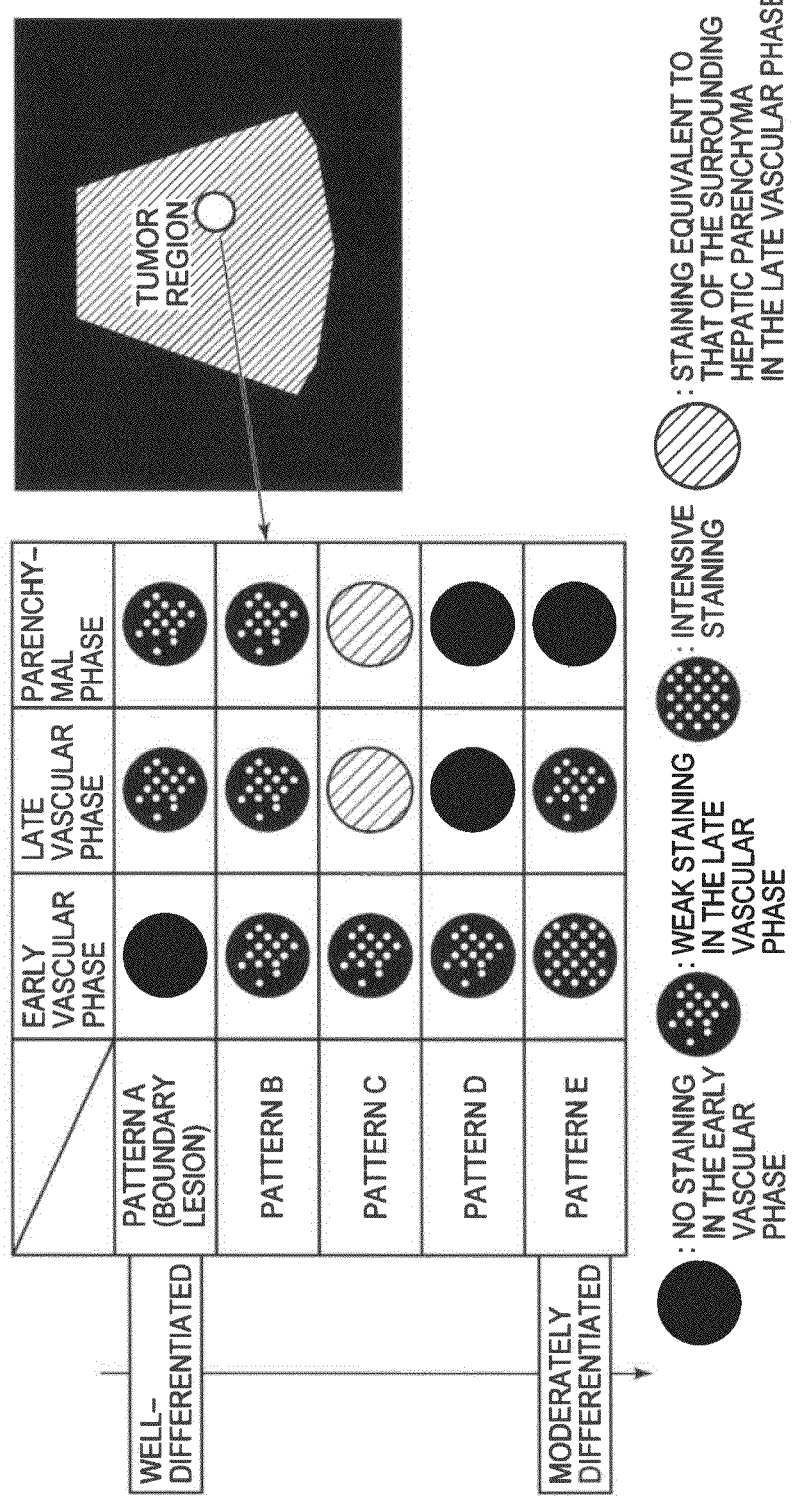
FIG. 2 is a diagram for describing the staining patterns for each degree of differentiation of a primary hepatocarcinoma.
Figure 3:
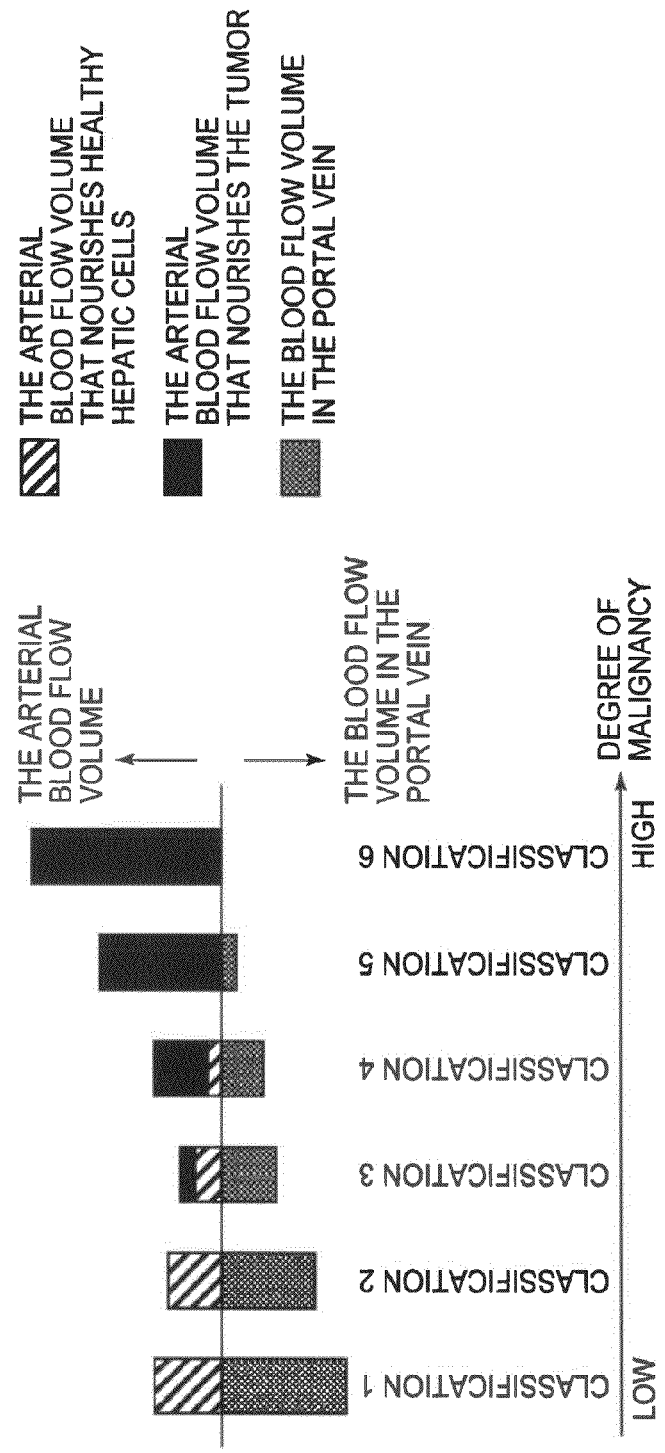
FIG. 3 is a diagram showing the correlation between the degree of malignancy of a liver tumor and the blood flow volume.

The first determination section 44 judges whether the arteries or the portal vein is dominant based on information of the peak point of the liver tumor TIC 200. The first determination section 44 determines the degree of malignancy (degree of differentiation) of the tumor based on this judgment. With reference to FIG. 10, a process of determining the degree of malignancy will be described. In the flow chart in FIG. 10, the classes 1-6 respectively correspond to the classes 1-6 shown in FIG. 3.

First, the first determination section 44 classifies the degree of malignancy of the liver tumor based on the number of peaks of the liver tumor TIC 200. If the number of peaks is 1, it is likely that this peak point is a peak point of the portal vein. However, in general, there cannot be cases in which there is no peak point of the arteries in the liver tumor region. Therefore, if the number of peaks is 1, that peak point is treated as a peak point resulting from the stained artery. Then, if the number of peaks of the liver tumor TIC is 1, the first determination section 44 determines that the degree of malignancy of the liver tumor is class 5 or 6. That is, because that one peak point is processed as being a peak point resulting from the stained artery, if the number of peaks is 1, the brightness value of the peak point resulting from the stained portal vein will be low or there will be no peak point present. In addition, in the TIC shown in FIG. 9, the TIC 350 and TIC 360 apply to class 5 or 6.

If the number of peaks of the liver tumor TIC 200 is 2, the first determination section 44 determines the degree of malignancy of the liver tumor based on the time and brightness value (mean brightness) of the peak point of the liver tumor TIC. Namely, the first determination section 44 determines the degree of malignancy of the liver tumor based on the correlation between the brightness value of the peak point at the relatively earlier time among the two peak points and the brightness value of the peak point at the relatively later time.

For example, if the brightness value of the peak point P1 of the artery from the earlier time is "moderate to low" and the brightness value of the peak point P2 of the portal vein from the later time is "high", the first determination section 44 determines that the degree of malignancy of the liver tumor is class 1 or 2. In addition, the TIC 310 and the TIC 330 shown in FIG. 9 apply to class 1 or 2.

Moreover, if the brightness value of the peak point P1 of the artery is "low to moderate" and the brightness value of the peak point P2 of the portal vein is "moderate", the first determination section 44 determines that the degree of malignancy of the liver tumor is class 3 or 4. In addition, the TIC 320 shown in FIG. 9 applies to class 3 or 4.

Moreover, if the brightness value of the peak point P1 of the artery is "moderate to high" and the brightness value of the peak point P2 of the portal vein is "low", the first determination section 44 determines that the degree of malignancy of the liver tumor is class 4 or 5. In addition, the TIC 340 shown in FIG. 9 applies to class 4 or 5.

The first determination section 44 outputs malignancy information indicating the degree of malignancy of the liver tumor to the display controller 6 and the determination result storage section 23.

The determination result storage section 23 stores malignancy information constituting the malignancy determination results.

Moreover, the display controller 6 displays the degree of malignancy indicated by the malignancy information on the display section 7. The first determination section 44 corresponds to an example of the "first determination part" of the present invention.

As described above, according to this embodiment, it is possible to obtain peak points of a TIC of the liver tumor region based on the plurality of ultrasonic image data along the time series and to objectively determine the degree of malignancy of the liver tumor based on the relationship between the brightness value of the peak point resulting from the stained artery and the brightness value of the peak point resulting from the stained portal vein. Namely, based on the dominance relationship between the arterial blood flow volume and the blood flow volume in the portal vein, it is possible to objectively determine the degree of malignancy of the liver tumor.

(Time Specification Section 45)

Figure 11:
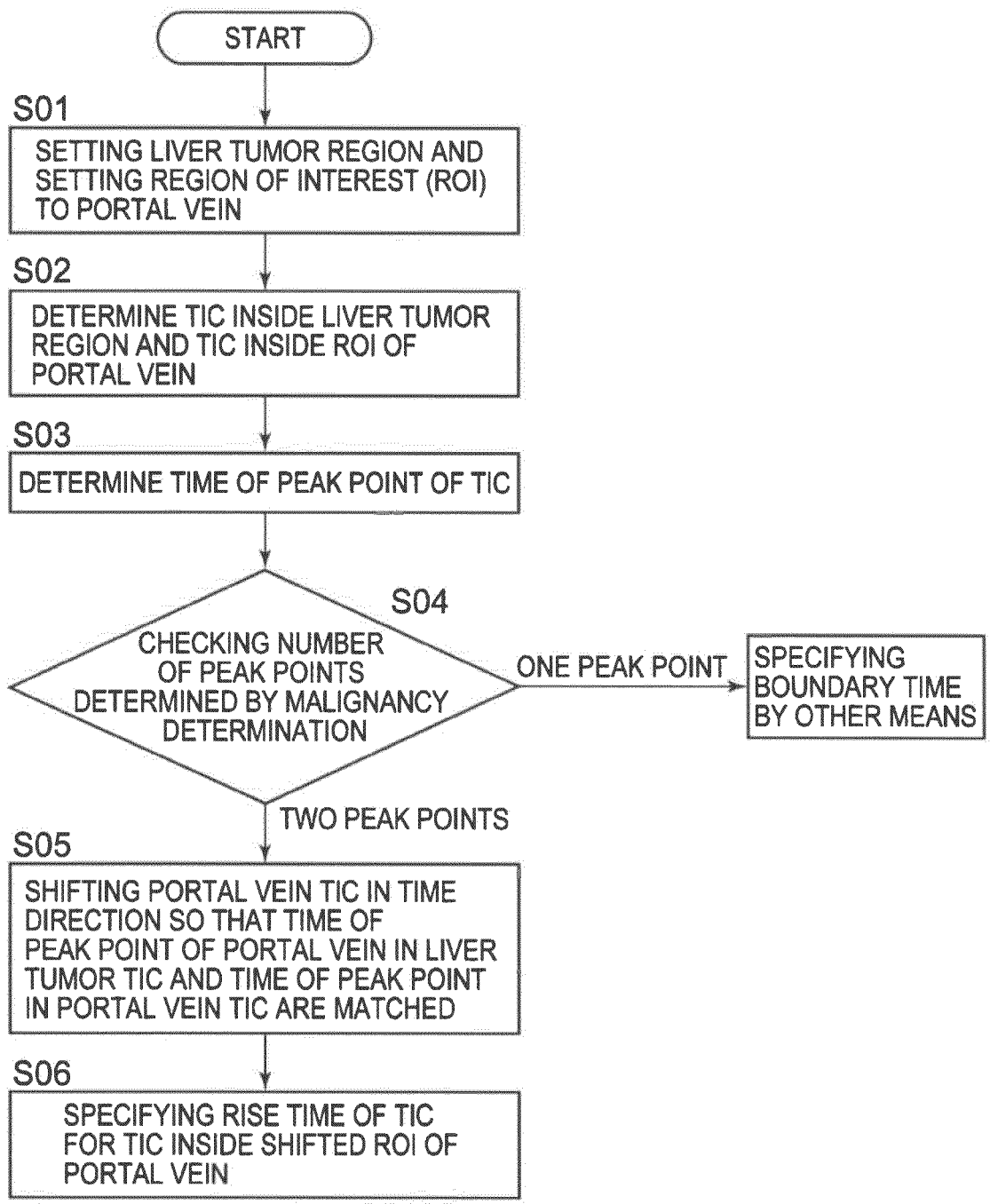
FIG. 11 is a flow chart showing a process for specifying the boundary time between the early vascular phase and the late vascular phase.
Figure 12:
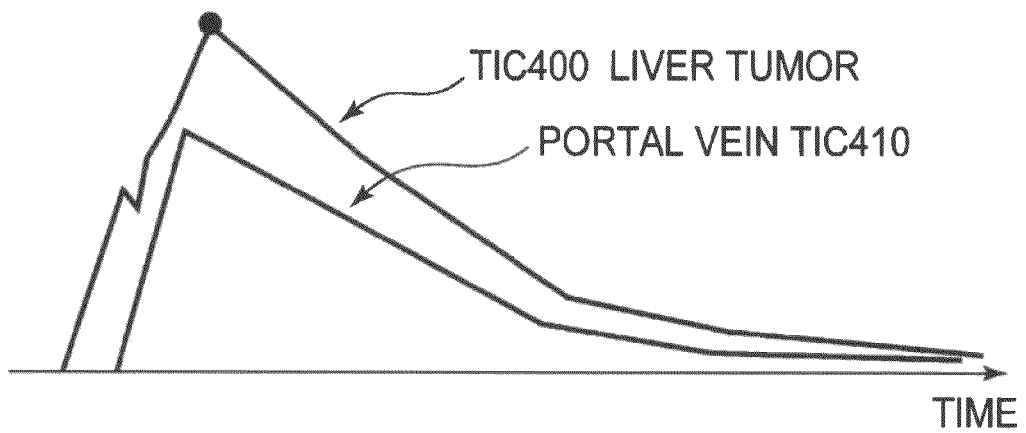
FIG. 12 is a diagram showing a TIC in the liver tumor region and a TIC in the region of interest (ROI) for the portal vein region.
Figure 13:
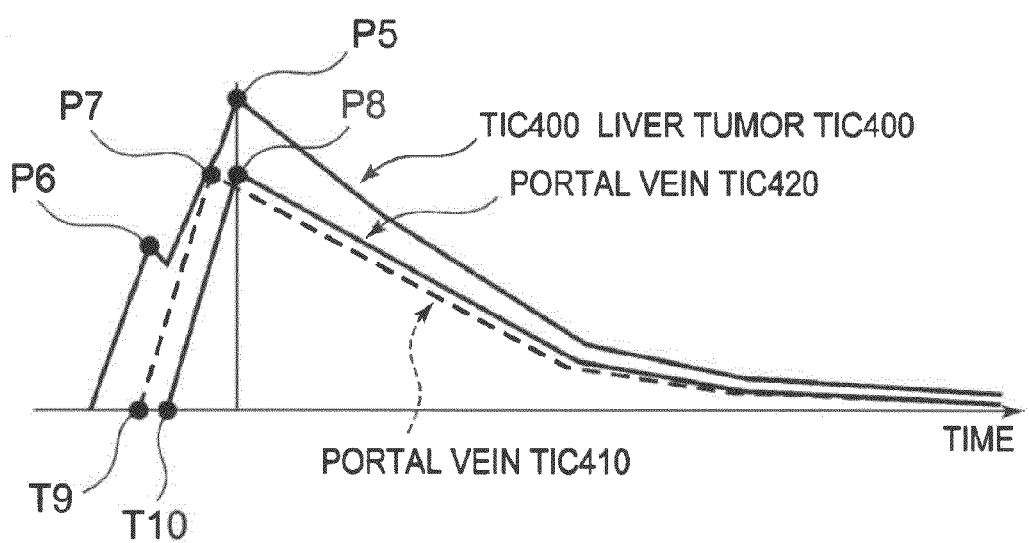
FIG. 13 is a diagram showing a TIC in the liver tumor region and a TIC in the region of interest (ROI) for the portal vein region.

Next, a process for specifying the boundary time between the early vascular phase (arterial phase) and the late vascular phase (portal vein phase) performed by the time specification section 45 will be described. The time specification section 45 comprises the judgment section 46 and the shift processing section 47. With reference to FIGS. 11 to 13, a process performed by the time specification section 45 will be described. FIG. 11 is a flow chart showing a process for specifying the boundary time between the early vascular phase and the late vascular phase. FIG. 12 is a diagram showing a TIC in the liver tumor region and a TIC in the region of interest (ROI) for the portal vein region. FIG. 13 is a diagram showing a TIC in the liver tumor region and a TIC in the region of interest (ROI) for the portal vein region.

The process of obtaining the boundary time is described as follows according to the flow chart shown in FIG. 11. In addition, the process of step S01 shown in FIG. 11 is the same as the above-mentioned process performed by the region setting section 3.

Moreover, the process of step S02 is the same as the above-mentioned process performed by the TIC generator 41. Moreover, the process of step S03 is the same as the above-mentioned process performed by the peak-detection section 43.

(Step S01)

As mentioned above, the tumor region setting section 31 specifies the position of the liver tumor region represented in each of the plurality of ultrasonic image along the time series and sets the liver tumor region for each ultrasonic image. Moreover, as shown in FIG. 6, the portal vein region setting section 32 sets the portal vein ROI 120 in the position of the portal vein region represented in each of the plurality of ultrasonic image along the time series. In this embodiment, the operator moves the portal vein ROI 120 on the ultrasonic image 100 using the operating section and designates the portal vein region by surrounding the portal vein region not included in the liver tumor region with the portal vein ROI 120. The portal vein region setting section 32 sets the portal vein region in the designated location. The region setting section 3 outputs, to the TIC generator 41 in the analyzer 4, the plurality of ultrasonic image data along the time series to be identified, coordinate information indicating the position of the liver tumor region set for each ultrasonic image, and coordinate information indicating the position of the portal vein ROI.

(Step S02)

As described above, the TIC generator 41 generates a liver tumor TIC representing time changes of the mean brightness by obtaining the mean brightness in the liver tumor region for all of the ultrasonic images along the time series to be identified. Similarly, the TIC generator 41 generates a portal vein TIC representing time changes of the mean brightness by obtaining the mean brightness in the portal vein ROI for all of the ultrasonic images along the time series to be identified. In FIG. 12, a liver tumor TIC 400 and a portal vein TIC 410 generated by the TIC generator 41 are shown. The TIC generator 41 outputs data of the liver tumor TIC 400 and data of the portal vein TIC 410 to the peak-detection section 43 and the shift processing section 47.

(Step S03)

As described above, the peak-detection section detects the peak point of the liver tumor TIC 400 by analyzing the gradient of the liver tumor TIC 400. Similarly, the peak-detection section 43 detects the peak point of the portal vein TIC 410 by analyzing the gradient of the portal vein TIC 410. The peak-detection section 43 outputs time information of the peak point of the liver tumor TIC 400 and time information of the peak point of the portal vein TIC 410 to the shift processing section 47. Moreover, the peak-detection section 43 outputs information indicating the number of peaks of the liver tumor TIC 400 to the judgment section 46 in the time specification section.

With reference to FIG. 13, the peak points detected by the peak-detection section 43 will be described. A peak point P5 and a peak point P6 are peak points detected from the liver tumor TIC 400.

Among these, the peak point P6 at the earlier time is a peak point resulting from the stained artery. The peak point P5 at the later time is a peak point resulting from the stained portal vein. Moreover, a peak point P7 is a peak point detected from the portal vein TIC 410.

When the peak points are detected in this way, the peak-detection section 43 outputs time information of the peak point P5, time information of the peak point P6, and time information of the peak point P7 to the shift processing section 47. Moreover, the peak-detection section 43 outputs information indicating the number of peaks of the liver tumor TIC 400 to the judgment section 46 in the time specification section 45.

(Step S04)

The judgment section 46 receives the information indicating the number of peaks of the liver tumor TIC output from the peak-detection section 43 and judges whether processing is to be executed or not depending on whether the number of peaks of the liver tumor TIC is 1 or 2.

If the number of peaks of the liver tumor TIC is 1, the judgment section 46 judges that execution of the processes from step S05 onward is cancelled. When this judgment is made, execution of the processes from step S05 onward is cancelled. In this case, the boundary time between the early vascular phase (arterial phase) and the late vascular phase (portal vein phase) is specified by another means. For example, a time following a fixed time after the peak of the artery TIC, or a time following a fixed time after the ultrasonic contrast agent is injected into the subject, is defined as the boundary time. Alternatively, the operator judges the boundary time by visually checking the ultrasonic image.

On the other hand, if the number of peaks of the liver tumor TIC is 2, the judgment section 46 judges that the processes from step S05 onward are to be executed. For example, as shown in FIGS. 12 and 13, if there are two peaks of the liver tumor TIC 400 (peak points P5, P6), the judgment section 46 judges that the processes from step S05 onward are to be executed.

The judgment section 46 outputs the instruction to execute or cancel the processes to the shift processing section 47. When it is judged that the processes are to be executed, the shift processing section 47 executes the processes from step S05 onward according to that judgment.

(Step S05)

The shift processing section 47 receives the liver tumor TIC data and the portal vein TIC data output from the TIC generator 41.

Moreover, the shift processing section 47 receives time information of the peak point of the liver tumor TIC and time information of the peak point of the portal vein TIC output from the peak-detection section 43. Then, the shift processing section 47 shifts the portal vein TIC in the time direction so that the time of the peak point of the portal vein in the liver tumor TIC and the time of the peak point in the portal vein TIC are matched.

With reference to FIG. 13, an example of a process performed by the shift processing section 47 will be described. The shift processing section 47 shifts the portal vein TIC 410 in the time direction so that the time of the peak point P5 of the portal vein in the liver tumor TIC 400 and the time of the peak point P7 of the portal vein TIC 410 are matched. Namely, the shift processing section 47 shifts the portal vein TIC 410 in the time direction so that among the peak points P5, P6 of the portal vein TIC 400, the time of the peak point P5 at the later time (peak point resulting from staining of the portal vein) and the time of the peak point P7 of the portal vein TIC 410 are matched. This shifts the peak point P7 to a peak point P8. Moreover, a portal vein TIC 420 is the portal vein TIC 410 shifted in the time direction.

(Step S06)

Then, the shift processing section 47 specifies a rise time T10 of the portal vein TIC 420 after shift processing and defines this time T10 as the boundary time between the early vascular phase (arterial phase) and the late vascular phase (portal vein phase). That is, a rise time T9 of the portal vein TIC 410 before shift processing is shifted to the rise time T10 of the portal vein TIC 420 due to the shift processing described above. The shift processing section 47 detects this time T10 and defines it as the boundary time. For example, the shift processing section 47 detects a time point at which the brightness value (mean brightness) of the portal vein TIC 420 is above the threshold as the rise time T10. Moreover, the shift processing section 47 may detect a time point at which the inclination of the portal vein TIC 420 exceeds a threshold as the rise time T10. The time specification section 45 corresponds to an example of the "time specification part" of the present invention.

In other words, the shift processing section 47 obtains the difference between the time of the peak point P5 of the liver tumor TIC 400 and the time of the peak point P7 of the portal vein TIC 410, and obtains the time of starting staining with the contrast agent indicated by the portal vein TIC 410 (the rise time T9 of the portal vein TIC 410) with that difference added (the time T10) as the boundary time.

The purpose of at the processes of steps S05 and S06 will be described. It is believed that in the liver tumor region, the boundary time between the arterial phase and the portal vein phase is almost matched to the start time T11 (not shown) of staining of the portal vein in the liver tumor region. Both this time T11 and the time T9 described above are rise times of the portal vein TIC, but it is likely that a difference will occur between the time T11 and the time T9 due to conditions of the liver, the distance between the liver tumor region and the portal vein, and other reasons. Therefore, in order to correct this time difference, the portal vein TIC 410 is shifted in the time direction so that the peak point P7 of the portal vein TIC 410 is matched to the peak point P5 (peak of the portal vein) of the liver tumor TIC 400. In this embodiment, the time T10 obtained in this way is deemed as the time T11 described above and defined as the boundary time.

As described above, according to this embodiment, it is possible to obtain the peak point of a TIC in the liver tumor region and the peak point of a TIC in the portal vein region based on the plurality of ultrasonic image data along the time series and to objectively obtain the boundary time between the arterial phase and the portal vein phase based on the time of the peak point resulting from staining of the portal vein.

The shift processing section 47 outputs boundary time information indicating the boundary time between the arterial phase and the portal vein phase to the display controller 6 and the determination result storage section 23. The determination result storage section 23 stores the boundary time information indicating the boundary time. Moreover, the display controller 6 displays the boundary time on the display section 7 based on the boundary time information. Moreover, the shift processing section 47 outputs the boundary time information to the type determination section 5.

(Type Determination Processing)

Figure 14A:
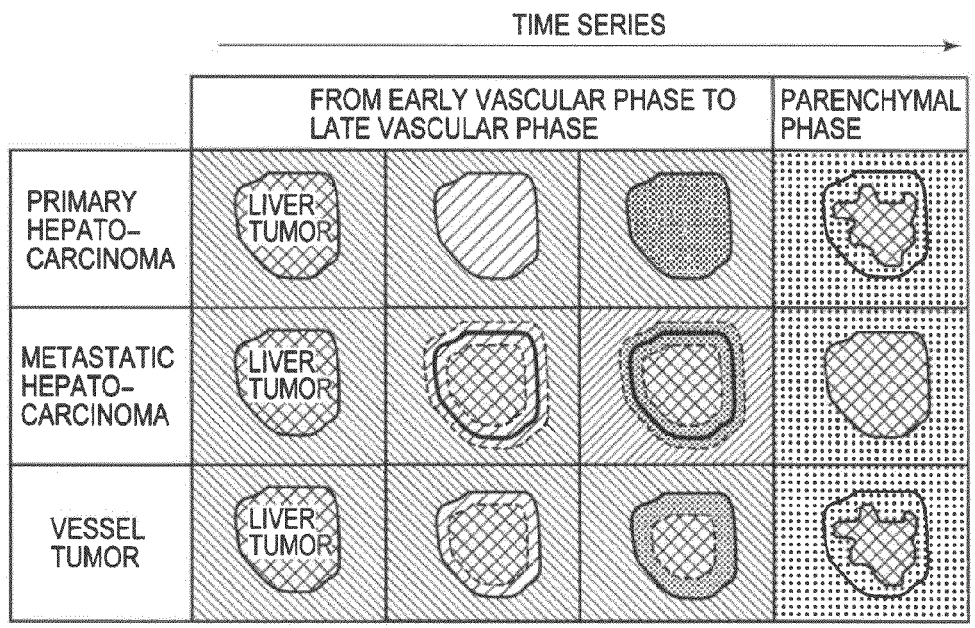
FIGS. 14A and 14B are diagrams for describing the staining patterns by type of liver tumor.
Figure 14B:
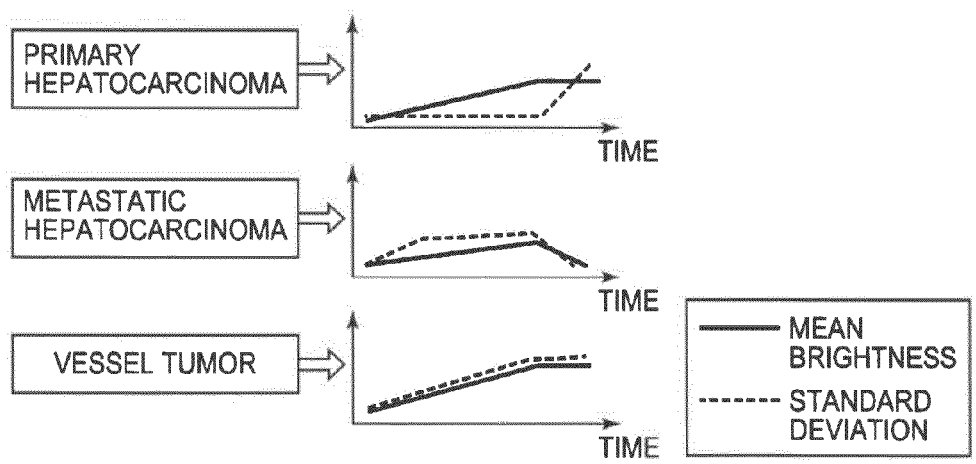

Next, with reference to FIGS. 14A and 14B, for a process for determining the type of liver tumor performed by the type determination section 5 will be described. FIGS. 14A and 14B are diagrams for describing staining patterns by type of liver tumor. In addition, FIG. 14A is a diagram showing ultrasonic images acquired along the time series. Moreover, FIG. 14A schematically shows the staining patterns in the periphery centered on a liver tumor from the early vascular phase (arterial phase) leading to the parenchymal phase via the late vascular phase (portal vein phase).

(Staining-Pattern-by-Type Storage Section 22)

The staining-pattern-by-type storage section 22 stores staining patterns of the ultrasonic contrast agent along the time series for the liver tumor as staining patterns by type classified by the type of liver tumor (primary hepatocarcinoma, metastatic hepatocarcinoma, or hemangioma). The staining-pattern-by-type storage section 22 corresponds to an example of the "staining-pattern-by-type storage part" of the present invention.

Specifically, the staining-pattern-by-type storage section 22 stores the staining patterns by type disclosed in "Differential diagnosis of neoplastic lesion of the liver with Levovist contrast ultrasound" (Rad Fan Vol. 2 No. 2: 62-65, 2004). The staining patterns by type are based on staining patterns specific to the type of liver tumor.

Next, with reference to FIG. 14A, the staining patterns along the time series specific to the type of liver tumor will be described. As shown in FIG. 14A, the staining patterns of primary hepatocarcinoma along the time series show that from the early vascular phase (arterial phase) to the late vascular phase (portal vein phase), the entire liver tumor region is gradually stained. Moreover, the staining patterns of primary hepatocarcinoma show that in the parenchymal phase, portions of the liver tumor other than the internal region and the hepatic parenchyma around the liver tumor are stained.

The staining patterns of metastatic hepatocarcinoma show that from the early vascular phase to the late vascular phase, the region from the outside leading to the inside centered on the boundary of the liver tumor is gradually stained. Moreover, the staining patterns of metastatic hepatocarcinoma show that in the parenchymal phase, the entire liver tumor is not stained and the hepatic parenchyma around the liver tumor is stained.

The staining patterns of hemangioma show that from the early vascular phase to the late vascular phase, the regions other than the internal region of the liver tumor are gradually stained. Moreover, the staining patterns of hemangioma show that in the parenchymal phase, portions of the liver tumor other than the internal region and the hepatic parenchyma around the liver tumor are stained.

Herein, as the staining patterns specific to the type of liver tumor shown in FIG. 14A are patterned based on two parameters (the mean of the brightness value (mean brightness) of each pixel in the region including the liver tumor, and the standard deviations of the brightness value of each pixel (hereinafter abbreviated as "standard deviations")), they may be represented as staining patterns along the time series specific to the type of liver tumor.

For example, as shown in FIG. 14B, if the liver tumor is a primary hepatocarcinoma, the mean brightness (solid line) rises over time before entering a stable variation pattern. The standard deviations (variation in brightness values) (broken line) undergo a transition at a small value before entering a steeply rising variation pattern.

If the liver tumor is a metastatic hepatocarcinoma, the mean brightness rises over time before entering a declining variation pattern.

The standard deviations rise steeply before rising mildly and then entering a declining variation pattern.

If the liver tumor is a hemangioma, the mean brightness and standard deviations rise over time before entering a stable variation pattern.

The staining-pattern-by-type storage section 22 stores the variation pattern (graph) of the mean brightness and the variation pattern (graph) of the standard deviations shown in FIG. 14B as staining patterns by type.

In addition, the staining patterns by type that the staining-pattern-by-type storage section 22 stores are not limited to the graphs shown in FIG. 14B. As another example, a table in which the mean brightness for each type of liver tumor is matched to the time series and a table in which numerical values of the standard deviations are matched to the time series may be defined as staining patterns by type.

(Type Determination Section 5)

The type determination section 5 comprises a staining-pattern generator 51 and a second determination section 52. The type determination section 5, based on the staining patterns by type stored by the staining-pattern-by-type storage section 22, determines whether the type of liver tumor set for the plurality of ultrasonic images by the tumor region setting section 31 corresponds to any of a primary hepatocarcinoma, a metastatic hepatocarcinoma, or a hemangioma.

(Staining-Pattern Generator 51)

The staining-pattern generator 51 receives the plurality of ultrasonic image data along the time series to be identified and positional information indicating the position of the liver tumor region set for each ultrasonic image from the region setting section 3. The staining-pattern generator 51 obtains the mean of the brightness value (mean brightness) and standard deviations (variation in brightness value) of each pixel in the liver tumor region set in the ultrasonic image. The staining-pattern generator 51 obtains the mean brightness and standard deviations in the liver tumor region for all of the ultrasonic images along the time series to be identified. Then, the staining-pattern generator 51 generates a variation pattern of the mean brightness by obtaining time changes of the mean brightness of the liver tumor region in each ultrasonic image. Moreover, the staining-pattern generator 51 generates a variation pattern of the standard deviations by obtaining time changes of the standard deviations of the liver tumor region in each ultrasonic image. The staining-pattern generator 51 outputs the variation pattern of the mean brightness and the variation pattern of the standard deviations to the second determination section 52. The variation pattern of the mean brightness and the variation pattern of the standard deviations generated by the staining-pattern generator 51 may be stored as staining patterns by type in the staining-pattern-by-type storage section 22. The variation pattern of the mean brightness and the variation pattern of the standard deviations correspond to examples of the "time changes of the mean value and standard deviations of pixel values" of the present invention.

(Second Determination Section 52)

The second determination section 52 performs pattern matching by targeting the variation pattern of the mean brightness and standard deviations in the liver tumor region and the staining patterns by type stored in the staining-pattern-by-type storage section 22. That is, the second determination section 52 performs pattern matching by targeting the variation pattern of the mean brightness and standard deviations in the liver tumor region and the variation patterns of the mean brightness and standard deviations for each type of liver tumor.

The second determination section 52 determines the type of liver tumor represented in an ultrasonic image to be identified by classifying the variation pattern of the mean brightness and standard deviations in the tumor region through this pattern matching. For example, the second determination section 52 determines the type of liver tumor through comparisons to determine the staining pattern by type most approximate to the variation pattern of the mean brightness and standard deviations in the tumor region. The second determination section 52 specifies the staining pattern by type most approximate to the variation pattern and determines that the type indicated by the specified staining pattern by type is a type of liver tumor to be identified.

For example, if the variation pattern of the mean brightness and standard deviations in the tumor region is matched with the staining pattern of a primary hepatocarcinoma, the second determination section determines that the type of liver tumor is "primary hepatocarcinoma".

The type determination section 5 outputs type information indicating the results of the liver tumor type determination to the display controller 6 and the determination result storage section 23.

The determination result storage section 23 stores the type information indicating the type determination results. Moreover, the display controller 6 displays the results of the liver tumor type determination on the display section 7 based on the type information.

The type determination section 5 corresponds to an example of the "type determination part" of the present invention.

The process for determining the liver tumor performed by the second determination section 52 is not limited to only performing pattern matching of the shapes of the abovementioned graphs. For example, the staining-pattern-by-type storage section 22 may store a table in which numerical values of the mean brightness and standard deviations for each liver tumor type are matched to the time series as a staining pattern by type. Then, the second determination section 52 obtains the mean brightness and standard deviations of the liver tumor region set in ultrasonic images along the time series.

The second determination section 52 compares and determines which staining pattern by type of liver tumor (a numerical value indicated by the table described above) is most approximate to the variation pattern of the mean brightness and standard deviations in the tumor region. The second determination section 52 makes the comparison described above in each time phase and determines the type of liver tumor based on the comparison and determination results. For example, the second determination section 52 determines the type of liver tumor based on a majority.

The staining-pattern generator 51 may, based on the boundary time between the arterial phase and the portal vein phase acquired by the time specification section 45 in the analyzer 4, classify a plurality of ultrasonic image data along the time series for each time phase and generate a staining pattern for each time phase. That is, because the boundary time described above has been obtained by the time specification section 45, the staining-pattern generator 51 may classify the plurality of ultrasonic image data along the time series into a plurality of ultrasonic image data in the arterial phase and a plurality of ultrasonic image data in the portal vein phase based on that boundary time. Then, the staining-pattern generator 51, based on the plurality of ultrasonic image data included in each time phase, obtains time changes of the mean brightness and time changes of the standard deviations for each individual time phase. This makes it possible to generate the variation pattern of the mean brightness and the variation pattern of the standard deviations for each individual time phase. That is, the staining-pattern generator 51 may generate the variation pattern of the mean brightness and standard deviations in the arterial phase and the variation pattern of the mean brightness and standard deviations in the portal vein phase separately. In this embodiment, because the boundary time between the arterial phase and the portal vein phase may be objectively obtained, it is possible to generate the variation pattern in the arterial phase and the variation pattern in the portal vein phase in an objectively separate manner.

In this case, for example, the second determination section 52 reads a staining pattern by type for each liver tumor in the arterial phase from the staining-pattern-by-type storage section 22. Then, the second determination section 52 determines the type of liver tumor by performing pattern matching by targeting the variation pattern of the mean brightness and standard deviations in the arterial phase and the staining pattern by type in the arterial phase. Alternatively, the second determination section 52 may read a staining pattern by type for each liver tumor in the portal vein phase from the staining-pattern-by-type storage section 22 and determine the type of liver tumor by performing pattern matching by targeting the variation pattern of the mean brightness and standard deviations in the portal vein phase and the staining pattern by type in the portal vein phase. In addition, the staining pattern by type for each liver tumor in the arterial phase and the staining pattern by type for each liver tumor in the portal vein phase have been previously generated and stored in the staining-pattern-by-type storage section 22.

Figure 15:
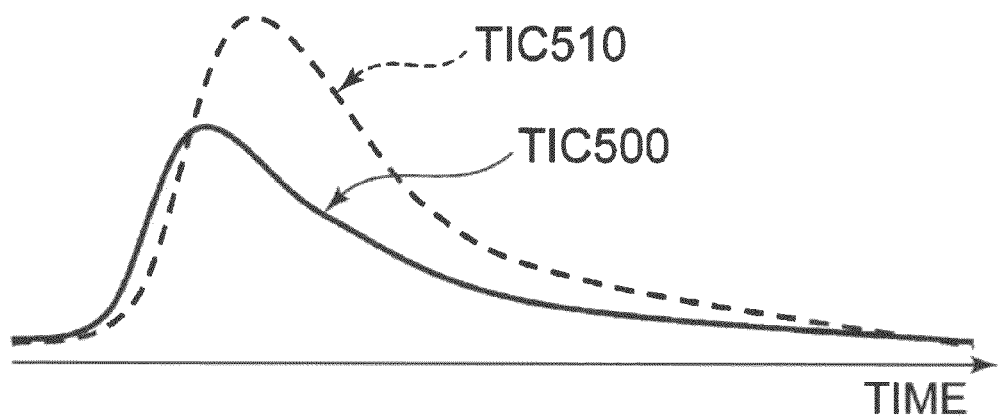
FIG. 15 is a diagram showing a TIC in the liver tumor region and a TIC in the portal vein ROI.

In the abovementioned malignancy determination, if only one peak is detected, the operator may doubt whether that peak is a peak resulting from actual staining of the artery. Therefore, the liver tumor TIC in the liver tumor region and the portal vein TIC in the portal vein ROI may be simultaneously displayed on the display section 7. In FIG. 15, an example of this display is shown. FIG. 15 is a diagram showing a TIC in the liver tumor region and a TIC in the portal vein ROI. The display controller 6 displays a liver tumor TIC 500 (solid line) in the liver tumor region generated by the TIC generator 41 and a portal vein TIC 510 (broken line) in the portal vein ROI generated by the TIC generator 41 simultaneously on the display section 7. The operator may judge whether staining in the portal vein is affecting the liver tumor TIC 500 by watching the liver tumor TIC 500 and the portal vein TIC 510 displayed on the display section 7. That is, it is possible to judge whether the blood flow to the artery is dominant or not based on staining in the liver tumor region.

In addition, the display section 7 is composed of a monitor such as CRT or a liquid crystal display. The display section 7, under the control of the display controller 6, displays the degree of malignancy, the boundary time between the arterial phase and the portal vein phase, and/or the type of liver tumor.

In addition, the tumor region setting section 31, the analyzer 4, the type determination section 5, and the display controller 6 may each be composed of a CPU (Central Processing Unit) (not shown) and a storage device (not shown) such as a ROM (Read Only Memory), RAM (Random Access Memory), or HDD (Hard Disk Drive).

In this case, stored in the storage device are a tumor region setting program for performing the functions of the tumor region setting section 31, an analysis program for performing the functions of the analyzer 4, a type determination program for performing the functions of the type determination section 5, and a display control program for performing the functions of the display controller 6.

Included in the analysis program are a TIC generation program for performing the functions of the TIC generator 41, a malignancy determination program for performing the functions of the malignancy determination section 42, and a time specification program for performing the functions of the time specification section 45. Moreover, included in the malignancy determination program are a peak detection program for performing the functions of the peak-detection section 43, and a first determination program for performing the functions of the first determination section 44. Moreover, included in the time specification program are a judgment program for performing the functions of the judgment section 46 and a shift processing program for performing the functions of the shift processing section 47. Moreover, included in the type determination program are a staining-pattern generation program for performing the functions of the staining-pattern generator 51 and a second determination program for performing the functions of the second determination section 52. Then, the CPU executes each program, thereby executing the functions of each section.

In addition, the ultrasonic imaging apparatus may comprise the functions of the medical image processing apparatus 1. For example, as with the ultrasonic imaging apparatus comprising the medical image processing apparatus 1 and the ultrasonic imaging apparatus 8, the same actions and effects as the medical image processing apparatus 1 according to this embodiment may be achieved. An example of the "ultrasonic imaging apparatus" of the present invention is composed of the medical image processing apparatus 1 and the ultrasonic imaging apparatus 8.

What is claimed is:

1. A medical image processing apparatus, comprising:
   a tumor region setting part configured to receive a plurality of ultrasonic image data along a time series acquired by ultrasonically capturing a subject to which a contrast agent has been administered and to set a liver tumor region for said plurality of ultrasonic image data along the time series;
   a first time-change calculator configured to obtain a first time change indicating a time change of pixel values in said set liver tumor region based on said plurality of ultrasonic image data along the time series;
   a first peak-detection part configured to specify at least a first peak point of said first time change and to obtain a time and pixel value of said first peak point;
   a first determination part configured to determine a degree of malignancy of said liver tumor based on the time and pixel value of said first peak point; and
   a display controller configured to cause a display to display said degree of malignancy determined by said first determination part, wherein
   if the first peak-detection part specifies two peak points based on said first time change, said first determination part is configured to determine said degree of malignancy of said liver tumor, based on a correlation between a pixel value of a peak point occurring at a relatively earlier time among said two peak points and a pixel value of a peak point occurring at a relatively later time among said two peak points.

2. The medical image processing apparatus of claim 1, wherein:
   said first time-change calculator is configured to obtain a time change of the mean value of the pixel values in said liver tumor region as said first time change by obtaining the mean value of the pixel values in said set liver tumor region for each ultrasonic image data.

3. The medical image processing apparatus of claim 1, further comprising:
   a region-of-interest setting part;
   a second time-change calculator; and
   a time specification part;
   wherein said region-of-interest setting part is configured to set a region of interest in a portal vein region represented in said plurality of ultrasonic image data along a time series;
   said second time-change calculator is configured to obtain second time change indicating a second time change of the pixel values in said set region of interest based on said plurality of ultrasonic image data along the time series;
   based on said first time change obtained by said first time-change calculator and said second time change obtained by said second time-change calculator, said time specification part is configured to specify a boundary time between a time phase in which only an artery is stained with said contrast agent and a time phase in which both said artery and said portal vein are stained with said contrast agent; and
   said display controller is configured to cause said display to display said boundary time specified by said time specification part.

4. The medical image processing apparatus of claim 3, further comprising:
   a second peak-detection part;
   wherein said second peak-detection part is configured to specify a second peak point of said second time change obtained by said second time-change calculator and to obtain the time of said second peak point; and
   said time specification part is configured to obtain the difference between the time of said first peak point obtained by said first peak-detection part and the time of said second peak point obtained by said second peak-detection part, and to add said difference to the time of starting staining with said contrast agent indicated by said second time change to obtain said boundary time.

5. The medical image processing apparatus of claim 3, further comprising:
   a staining-pattern-by-type storage part; and
   a type determination part;
   wherein said staining-pattern-by-type storage part is configured to store staining patterns representing time changes of the mean value and standard deviations of the pixel values in said liver tumor as staining patterns by type classified by the type of said liver tumor;
   based on said boundary time obtained by said time specification part, said type determination part is configured to classify said plurality of ultrasonic image data along the time series into ultrasonic image data obtained in an arterial phase and ultrasonic image data obtained in a portal vein phase, to obtain time changes of the mean value and standard deviations of the pixel values in said liver tumor in said arterial phase or time changes of the mean value and standard deviations of the pixel values in said portal vein phase according to said classification, and to perform pattern matching of said staining patterns by type stored in said staining-pattern-by-type storage part and said time changes in said arterial phase or said time changes in said portal vein, thereby determining the type of said liver tumor; and
   said display controller is configured to cause said display part to display the type of said liver tumor determined by said type determination part.

6. The medical image processing apparatus of claim 1, further comprising:
   a staining-pattern-by-type storage part; and
   a type determination part;
   wherein said staining-pattern-by-type storage part is configured to store staining patterns representing staining of said contrast agent in said liver tumor along the time series as staining patterns by type classified by the type of said liver tumor;
   said type determination part is configured to determine the type of said liver tumor set by said liver tumor region setting part based on said staining patterns by type stored in said staining-pattern-by-type storage part; and
   said display controller is configured to said display part to display the type of said liver tumor determined by said type determination part.

7. The medical image processing apparatus of claim 6, wherein:
   said staining-pattern-by-type storage part is configured to store time changes of the mean value and standard deviations of the pixel values in said liver tumor as said staining patterns by type; and based on said plurality of ultrasonic image data along the time series, said type determination part is configured to obtain time changes of the mean value and standard deviations of the pixel values in said liver tumor, and to perform pattern matching of said staining patterns by type stored in said staining-pattern-by-type storage part and said time changes, thereby determining the type of said liver tumor.

8. The medical image processing apparatus of claim 5, wherein:
said staining-pattern-by-type-storage part is configured to store staining patterns by type for each type of liver tumor, including primary hepatocarcinoma, metastatic hepatocarcinoma, and hemangioma; and
said type determination part is configured to determine the type of said liver tumor as any of primary hepatocarcinoma, metastatic hepatocarcinoma, or hemangioma.

9. An ultrasonic imaging apparatus, comprising:
an ultrasonic imaging part configured to acquire a plurality of ultrasonic image data along a time series by ultrasonically capturing a subject to which a contrast agent has been administered;
a liver tumor region setting part configured to set a liver tumor region for said plurality of ultrasonic image data along the time series;
a first time-change calculator configured to obtain a first time change indicating a time change of pixel values in said set liver tumor region based on said plurality of ultrasonic image data along the time series;
a first peak-detection part configured to specify at least a first peak point of said first time change and to obtain a time and pixel value of said first peak point;
a first determination part configured to determine a degree of malignancy of said liver tumor based on the time and pixel value of said first peak point; and
a display controller configured to cause a display part to display said degree of malignancy determined by said first determination part, wherein
if the first peak-detection part specifies two peak points based on said first time change, said first determination part is configured to determine said degree of malignancy of said liver tumor, based on a correlation between a pixel value of a peak point occurring at a relatively earlier time among said two peak points and a pixel value of a peak point occurring at a relatively later time among said two peak points.

10. The ultrasonic imaging apparatus of claim 9, wherein:
said first time-change calculator is configured to obtain a time change of the mean value of the pixel values in said liver tumor region as said first time change by obtaining the mean value of the pixel values in said set liver tumor region for each ultrasonic image data.

11. The ultrasonic imaging apparatus of claim 9, further comprising:
a region-of-interest setting part;
a second time-change calculator; and
a time specification part;
wherein said region-of-interest setting part is configured to set a region of interest in a portal vein region represented in said plurality of ultrasonic image data along a time series;
said second time-change calculator is configured to obtain a time-second time change indicating a time change of the pixel values in said set region of interest based on said plurality of ultrasonic image data along the time series;
based on said first time change obtained by said first time-change calculator and said second time change obtained by said second time-change calculator, said time specification part is configured to specify a boundary time between a time phase in which only an artery is stained with said contrast agent and a time phase in which both said artery and said portal vein are stained with said contrast agent; and
said display controller is configured to cause said display part to display said boundary time specified by said time specification part.

12. The ultrasonic imaging apparatus of claim 11, further comprising:
a second peak-detection part;
wherein said second peak-detection part is configured to specify a second peak point of said second time change obtained by said second time-change calculator and to obtain the time of said second peak point; and
said time specification part is configured to obtain the difference between the time of said first peak point obtained by said first peak-detection part and the time of said second peak point obtained by said second peak-detection part, and to add said difference to the time of starting staining with said contrast agent indicated by said second time change to obtain said boundary time.

13. The ultrasonic imaging apparatus of claim 11, further comprising:
a staining-pattern-by-type storage part; and
a type determination part;
wherein said staining-pattern-by-type storage part is configured to store staining patterns representing time changes of the mean value and standard deviations of the pixel values in said liver tumor as staining patterns by type classified by the type of said liver tumor;
based on said boundary time obtained by said time specification part, said type determination part is configured to classify said plurality of ultrasonic image data along the time series into ultrasonic image data obtained in an arterial phase and ultrasonic image data obtained in a portal vein phase, to obtain time changes of the mean value and standard deviations of the pixel values in said liver tumor in said arterial phase or time changes of the mean value and standard deviations of the pixel values in said portal vein phase according to said classification, and to perform pattern matching of said staining patterns by type stored in said staining-pattern-by-type storage part and said time change in said arterial phase or said time change in said portal vein, thereby determining the type of said liver tumor; and
said display controller is configured to cause said display part to display the type of said liver tumor determined by said type determination part.

14. The ultrasonic imaging apparatus of claim 9, further comprising:
a staining-pattern-by-type storage part; and
a type determination part;
wherein said staining-pattern-by-type storage part is configured to store staining patterns representing staining of said contrast agent in said liver tumor along the time series as staining patterns by type classified by the type of said liver tumor;
said type determination part is configured to determine the type of said liver tumor set by said liver tumor region setting part based on said staining patterns by type stored in said staining-pattern-by-type storage part; and said display controller is configured to cause said display part to display the type of said liver tumor determined by said type determination part.

15. The ultrasonic imaging apparatus of claim 14, wherein:
said staining-pattern-by-type storage part is configured to store time changes of the mean value and standard deviations of the pixel values in said liver tumor as said staining patterns by type; and
based on said plurality of ultrasonic image data along the time series, said type determination part is configured to obtain time changes of the mean value and standard deviations of the pixel values in said liver tumor, and to perform pattern matching of said staining patterns by type stored in said staining-pattern-by-type storage part and said time changes, thereby determining the type of said liver tumor.

16. The ultrasonic imaging apparatus of claim 13, wherein:
said staining-pattern-by-type storage part is configured to store staining patterns by type for each type of liver tumor, including primary hepatocarcinoma, metastatic hepatocarcinoma, and hemangioma; and
said type determination part is configured to determine the type of said liver tumor as any of primary hepatocarcinoma, metastatic hepatocarcinoma, or hemangioma.

\* \* \* \* \*